(12) United States Patent
Brand et al.

(10) Patent No.: US 11,273,911 B2
(45) Date of Patent: Mar. 15, 2022

(54) DETACHABLE POWER TETHERING SYSTEMS FOR AIRCRAFT

(71) Applicant: Textron Innovations Inc., Providence, RI (US)

(72) Inventors: Albert G. Brand, N. Richland Hills, TX (US); Scott David Poster, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 337 days.

(21) Appl. No.: 16/546,082

(22) Filed: Aug. 20, 2019

(65) Prior Publication Data

US 2021/0053676 A1   Feb. 25, 2021

(51) Int. Cl.
*B64C 39/02*     (2006.01)
*B64F 3/02*      (2006.01)
*B64C 29/00*     (2006.01)

(52) U.S. Cl.
CPC ........ *B64C 39/022* (2013.01); *B64C 29/0033* (2013.01); *B64F 3/02* (2013.01); *B64C 39/024* (2013.01); *B64C 2201/066* (2013.01); *B64C 2201/108* (2013.01)

(58) Field of Classification Search
CPC ... B64C 39/022; B64C 2201/066; B64F 3/02; B64F 3/00
USPC ...................................................... 244/110 C
See application file for complete search history.

(56) References Cited

U.S. PATENT DOCUMENTS

| 3,149,803 | A  | * | 9/1964 | Petrides | B64C 39/022 244/17.13 |
|---|---|---|---|---|---|
| 8,646,719 | B2 | * | 2/2014 | Morris | B64C 19/00 244/1 TD |
| 9,446,858 | B2 |   | 9/2016 | Hess | |
| 9,786,105 | B2 | * | 10/2017 | Moloney | G07C 5/0841 |
| 9,926,084 | B2 |   | 3/2018 | Peverill et al. | |
| 10,007,272 | B2 |   | 6/2018 | Tirpak et al. | |
| 10,099,782 | B2 |   | 10/2018 | Hundemer | |
| 10,384,777 | B1 | * | 8/2019 | Welsh | B64F 3/02 |
| 2010/0308174 | A1 | * | 12/2010 | Calverley | B64C 39/022 244/155 A |
| 2013/0233964 | A1 | * | 9/2013 | Woodworth | G05D 1/104 244/2 |
| 2015/0041598 | A1 | * | 2/2015 | Nugent | B64C 39/022 244/53 R |
| 2015/0054282 | A1 | * | 2/2015 | Goldstein | F03D 13/22 290/44 |
| 2015/0102154 | A1 | * | 4/2015 | Duncan | G05D 1/0094 244/2 |

(Continued)

FOREIGN PATENT DOCUMENTS

DE   102014109099 A1 * 12/2015 ............ B64C 31/06

*Primary Examiner* — Christopher P Ellis
(74) *Attorney, Agent, or Firm* — Lawrence Youst PLLC

(57) ABSTRACT

An electric power tethering system for an aircraft having a vertical takeoff and landing flight mode including a takeoff phase and/or a hover phase includes a surface power source and a power tether having a surface end configured to couple to the surface power source and an aircraft end configured to couple to the aircraft. The power tether is configured to transmit power from the surface power source to the aircraft in the takeoff phase and/or the hover phase. The power tether is detachable to decouple the surface power source from the aircraft in response to a power tether release event during flight.

20 Claims, 17 Drawing Sheets

(56) References Cited

U.S. PATENT DOCUMENTS

| | | | |
|---|---|---|---|
| 2015/0180186 A1* | 6/2015 | Vander Lind | H01R 35/02 |
| | | | 290/55 |
| 2016/0083115 A1* | 3/2016 | Hess | B64C 39/022 |
| | | | 701/3 |
| 2016/0200437 A1* | 7/2016 | Ryan | B64C 39/022 |
| | | | 244/99.2 |
| 2016/0318607 A1* | 11/2016 | Desai | A01M 7/00 |
| 2017/0021944 A1 | 1/2017 | Peverill et al. | |
| 2017/0029105 A1* | 2/2017 | Ferren | B64C 39/022 |
| 2017/0113816 A1* | 4/2017 | High | B64C 39/022 |
| 2017/0144754 A1 | 5/2017 | Limvorapun et al. | |
| 2017/0158354 A1* | 6/2017 | Bourne | B64C 39/024 |
| 2017/0355460 A1* | 12/2017 | Shannon | B64D 17/383 |
| 2017/0363066 A1* | 12/2017 | Hart | B64C 39/022 |
| 2018/0050798 A1* | 2/2018 | Kapuria | B60L 53/22 |
| 2018/0244384 A1* | 8/2018 | Phan | B64C 39/026 |
| 2019/0285055 A1* | 9/2019 | von Flotow | F03D 9/257 |
| 2020/0225684 A1* | 7/2020 | Anderson | G05D 1/0022 |
| 2020/0307399 A1* | 10/2020 | Lashbrook | B64C 39/024 |
| 2020/0307786 A1* | 10/2020 | Tavakolikhakaledi | B64F 3/00 |
| 2020/0314627 A1* | 10/2020 | Fischer | B64C 39/024 |
| 2020/0369408 A1* | 11/2020 | Dolata | B64F 3/02 |
| 2020/0377210 A1* | 12/2020 | McRoberts | B64C 39/022 |
| 2020/0385115 A1* | 12/2020 | Piasecki | B64C 39/024 |
| 2021/0011492 A1* | 1/2021 | Raabe | B64D 1/22 |

\* cited by examiner

DETACHABLE POWER TETHERING SYSTEMS FOR AIRCRAFT

TECHNICAL FIELD OF THE DISCLOSURE

The present disclosure relates, in general, to electrical power systems operable for use on aircraft and, in particular, to power tethering systems for vertical takeoff and landing aircraft that provide a detachable power connection between a surface power source and the aircraft during takeoff and hover operations.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another example of VTOL aircraft, attempt to overcome this drawback by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric VTOL (eVTOL) aircraft utilize electricity, either exclusively or in conjunction with liquid fuel, to power the various systems of the aircraft including the propulsion system. It has been found, however, that current eVTOL aircraft consume a disproportionate amount of electrical power during takeoff and hover operations as compared to other phases of flight such as forward flight and landing. Attempts have been made to compensate for the disproportionate amount of power used by eVTOL aircraft during takeoff and hover operations by including oversized battery arrays. These battery arrays, however, increase the overall weight and cost of the aircraft while also reducing flight payload and/or range. Accordingly, a need has arisen for an improved power system for eVTOL aircraft that overcomes the disproportionate power consumption during takeoff and hover operations and that does not reduce the flight payload or range.

SUMMARY

In a first aspect, the present disclosure is directed to an electric power tethering system for an aircraft having a vertical takeoff and landing flight mode including a takeoff phase and a hover phase. The electric power tethering system includes a surface power source and a power tether having a surface end configured to couple to the surface power source and an aircraft end configured to couple to the aircraft. The power tether is configured to transmit power from the surface power source to the aircraft in the takeoff phase and/or the hover phase. The power tether is detachable to decouple the surface power source from the aircraft in response to a power tether release event during flight.

In some embodiments, the surface power source may include a power grid, a generator and/or a battery. In certain embodiments, the surface power source may include a retraction spool configured to retract the power tether following the power tether release event. In some embodiments, the surface power source may be a mobile surface power source configured to move along a surface while the power tether couples the mobile surface power source to the aircraft. In certain embodiments, the electric power tethering system may include a land vehicle to transport the mobile surface power source along a land surface. In some embodiments, the electric power tethering system may include a water vehicle to transport the mobile surface power source along a water surface. In certain embodiments, the surface end of the power tether may be detachable from the surface power source in response to the power tether release event.

In a second aspect, the present disclosure is directed to an aircraft system including an eVTOL aircraft having a vertical takeoff and landing flight mode including a takeoff phase and a hover phase, a surface power source and a power tether having a surface end configured to couple to the surface power source and an aircraft end configured to couple to the aircraft. The power tether is configured to transmit power from the surface power source to the aircraft in the takeoff phase and the hover phase. The power tether is detachable to decouple the surface power source from the aircraft in response to a power tether release event during flight.

In some embodiments, the aircraft may include a power inlet configured to couple to the aircraft end of the power tether, the aircraft end of the power tether detachable from the power inlet of the aircraft in response to the power tether release event. In certain embodiments, the power tether release event may include a manual user command, the power tether extending beyond a power tether extension distance threshold, a power consumption of the aircraft falling below a tether power consumption threshold and/or the aircraft converting to the forward flight mode. In some embodiments, the aircraft may include an onboard battery configured to provide electric power. In certain embodiments, the aircraft system may include a power management module configured to allocate power input for the aircraft from the onboard battery and the surface power source in the takeoff phase and the hover phase. In some embodiments, the aircraft may include a retraction spool configured to retract the power tether.

In a third aspect, the present disclosure is directed to a method for providing electric power in an aircraft system including attaching a surface power source to an electrically powered aircraft using a power tether, the aircraft having a vertical takeoff and landing flight mode including a takeoff phase; providing electric power to the aircraft from the surface power source via the power tether during the takeoff phase; and detaching the surface power source from the aircraft in response to a power tether release event during flight.

In some embodiments, the method may include providing power to the aircraft from the surface power source via the power tether during a hover phase. In certain embodiments, the method may include performing aircraft system checks of the aircraft during the hover phase while electric power is provided to the aircraft via the power tether. In some embodiments, the method may include charging a battery onboard the aircraft from the surface power source via the power tether while the aircraft is on the ground.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
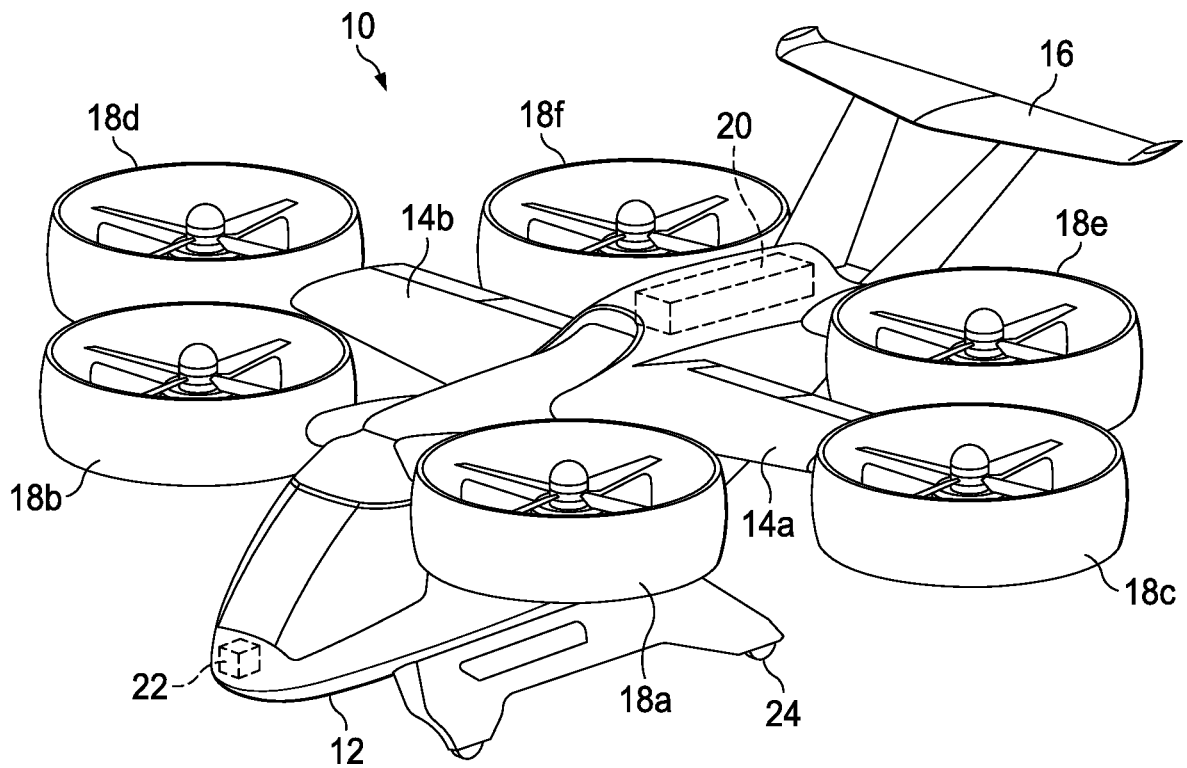
FIGS. 1A-1B are schematic illustrations of an electric vertical takeoff and landing aircraft for use with an electric power tethering system in accordance with embodiments of the present disclosure.
Figure 1B:
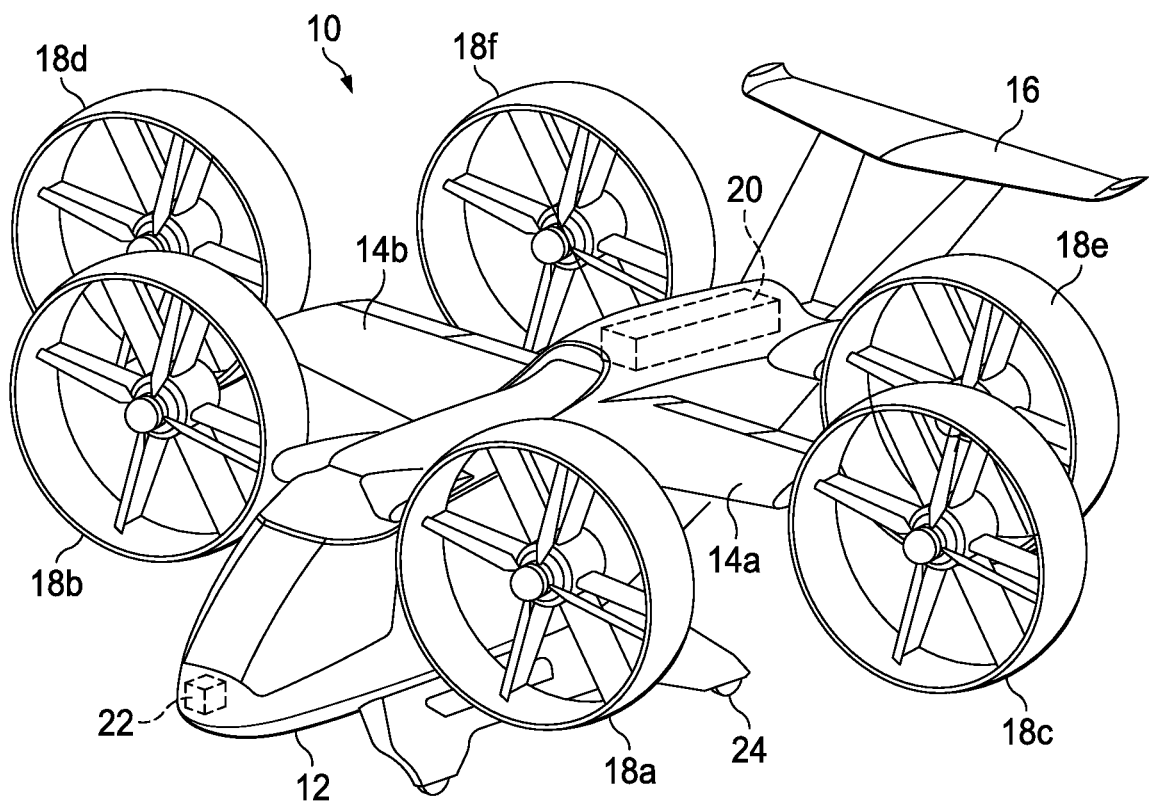

Referring to FIGS. 1A-1B in the drawings, isometric views of an electric vertical takeoff and landing (eVTOL) aircraft 10 for use with an electric power tethering system are depicted. FIG. 1A depicts eVTOL aircraft 10 in a VTOL flight mode wherein the rotor systems provide thrust-borne lift. VTOL flight mode includes takeoff, hover and landing phases of flight. FIG. 1B depicts eVTOL aircraft 10 in a forward flight mode wherein the rotor systems provide forward thrust with the forward airspeed of eVTOL aircraft 10 providing wing-borne lift enabling eVTOL aircraft 10 to have a high speed and/or high endurance forward flight mode. In the illustrated embodiment, eVTOL aircraft 10 includes a fuselage 12, wings 14a, 14b and a tail assembly 16. Wings 14a, 14b have an airfoil cross-section that generates lift responsive to the forward airspeed of eVTOL aircraft 10. In the illustrated embodiment, wings 14a, 14b are straight wings with a tapered leading edge. It will be appreciated, however, that wings 14a, 14b may be of a wide variety of shapes, sizes and configurations, depending upon the performance characteristics desired. In the illustrated embodiment, wings 14a, 14b include ailerons to aid in roll and/or pitch control of eVTOL aircraft 10 during forward flight. Tail assembly 16 is depicted as having a pair of vertical stabilizers that may include one or more rudders to aid in yaw control of eVTOL aircraft 10 during forward flight. In addition, tail assembly 16 has a horizontal stabilizer that may include one or more elevators to aid in pitch control of eVTOL aircraft 10 during forward flight. It will be appreciated, however, that tail assembly 16 may be of a wide variety of shapes, sizes and configurations, depending upon the performance characteristics desired.

In the illustrated embodiment, eVTOL aircraft 10 includes six rotor systems forming a two-dimensional distributed thrust array. The thrust array of eVTOL aircraft 10 includes a forward-port rotor system 18a, a forward-starboard rotor system 18b, a mid-port rotor system 18c, a mid-starboard rotor system 18d, an aft-port rotor system 18e and an aft-starboard rotor system 18f, which may be referred to collectively as rotor systems 18. Forward-port rotor system 18a and forward-starboard rotor system 18b are each rotatably mounted to a shoulder portion of fuselage 12 at a forward station thereof. Mid-port rotor system 18c is rotatably mounted on the outboard end of wing 14a. Mid-starboard rotor system 18d is rotatably mounted on the outboard end of wing 14b. Aft-port rotor system 18e and aft-starboard rotor system 18f are each rotatably mounted to a shoulder portion of fuselage 12 at an aft station thereof. In the illustrated embodiment, rotor systems 18 are ducted rotor systems each having a four bladed rotor assembly with variable pitch rotor blades operable for collective pitch control. Rotor systems 18 may each include at least one variable speed electric motor and a speed controller configured to provide variable speed control to the rotor assembly over a wide range of rotor speeds, or alternatively may each include at least one constant speed electric motor to provide fixed RPM. In other embodiments, the rotor systems could be non-ducted or open rotor systems, the number of rotor blades could be either greater than or less than four and/or the rotor blades could have a fixed pitch. eVTOL aircraft 10 may include any number of rotor systems either greater than or less than six rotor systems such as a single main rotor or a coaxial rotor system.

When eVTOL aircraft 10 is operating in the VTOL orientation and supported by thrust-borne lift, rotor systems 18 each have a generally horizontal position such that the rotor assemblies are rotating in generally the same horizontal plane, as best seen in FIG. 1A. When eVTOL aircraft 10 is operating in the forward flight orientation and supported by wing-borne lift, rotor systems 18 each have a generally vertical position with the forward rotor assemblies rotating generally in a forward vertical plane, the mid rotor assemblies rotating generally in a mid vertical plane and the aft rotor assemblies rotating generally in an aft vertical plane, as best seen in FIG. 1B. Transitions between the VTOL orientation and the forward flight orientation of eVTOL aircraft 10 are achieved by changing the angular positions of rotor systems 18 between their generally horizontal positions and the generally vertical positions.

In some embodiments, eVTOL aircraft 10 may include a liquid fuel powered turbo-generator that includes a gas turbine engine and an electric generator. The electric generator may charge a battery 20 that provides power to the electric motors of rotor systems 18 via a power management system. Battery 20 may include an array of batteries. In other embodiments, the turbo-generator may provide power directly to the power management system and/or the electric motors of rotor systems 18. In yet other embodiments, eVTOL aircraft 10 may rely on battery 20 as the onboard power source for rotor systems 18 to the exclusion of a liquid fuel powered engine or turbo-generator.

eVTOL aircraft 10 has a fly-by-wire control system that includes a flight control system 22 that is preferably a redundant digital flight control system including multiple independent flight control computers. Flight control system 22 preferably includes non-transitory computer readable storage media including a set of computer instructions executable by one or more processors for controlling the operation of eVTOL aircraft 10. Flight control system 22 may be implemented on one or more general-purpose computers, special purpose computers or other machines with memory and processing capability. Flight control system 22 may include one or more memory storage modules including random access memory, non-volatile memory, removable memory or other suitable memory entity. Flight control system 22 may be a microprocessor-based system operable to execute program code in the form of machine-executable instructions. Flight control system 22 may be connected to other computer systems via a suitable communication network that may include both wired and wireless connections.

Flight control system 22 communicates via a wired communications network with the electronics nodes of each rotor system 18. In some embodiments, flight control system 22 receives sensor data from and sends flight command information to rotor systems 18 such that each rotor system 18 may be individually and independently controlled and operated. For example, flight control system 22 may be operable to individually and independently control the rotor speed of each rotor system 18 as well as the angular position of each rotor system 18. Flight control system 22 may autonomously control some or all aspects of flight operation for eVTOL aircraft 10. Flight control system 22 is also operable to communicate with remote systems, such as a ground station via a wireless communications protocol. The remote system may be operable to receive flight data from and provide commands to flight control system 22 to enable remote flight control over some or all aspects of flight operation for eVTOL aircraft 10. In addition, eVTOL aircraft 10 may be pilot operated such that a pilot interacts with a pilot interface that receives flight data from and provides commands to flight control system 22 to enable onboard pilot control over some or all aspects of flight operation for eVTOL aircraft 10.

eVTOL aircraft 10 includes landing gear 24 for ground operations. Landing gear 24 may include passively operated pneumatic landing struts or actively operated landing struts. In the illustrated embodiment, landing gear 24 includes a plurality of wheels that enable eVTOL aircraft 10 to taxi and perform other ground maneuvers. Landing gear 24 may include a passive brake system, an active brake system such as an electromechanical braking system and/or a manual brake system to facilitate parking as required during ground operations and/or passenger ingress and egress.

Figure 2A:
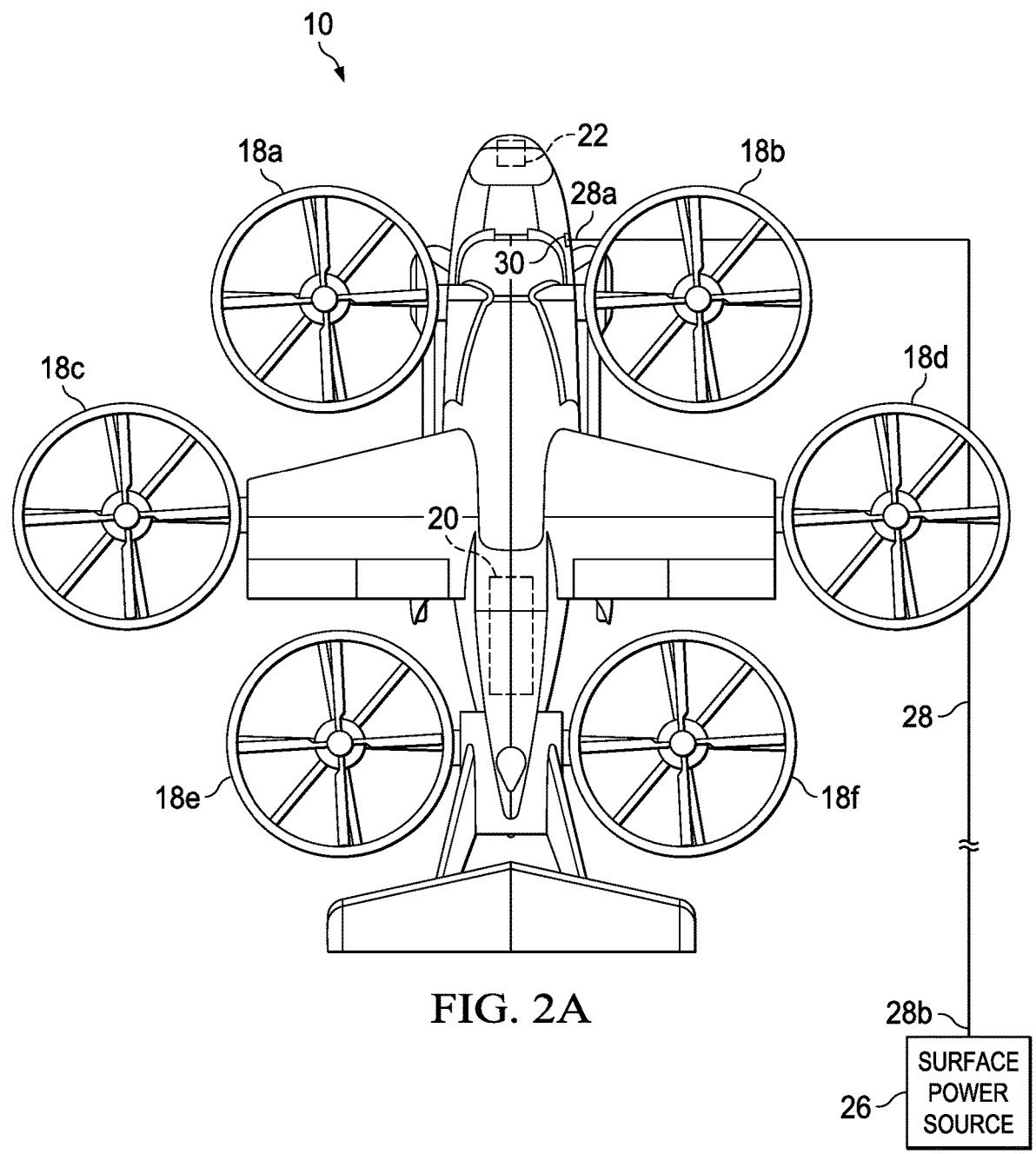
FIGS. 2A-2B are a schematic illustration and a block diagram of an electric vertical takeoff and landing aircraft using an electric power tethering system in accordance with embodiments of the present disclosure.
Figure 2B:
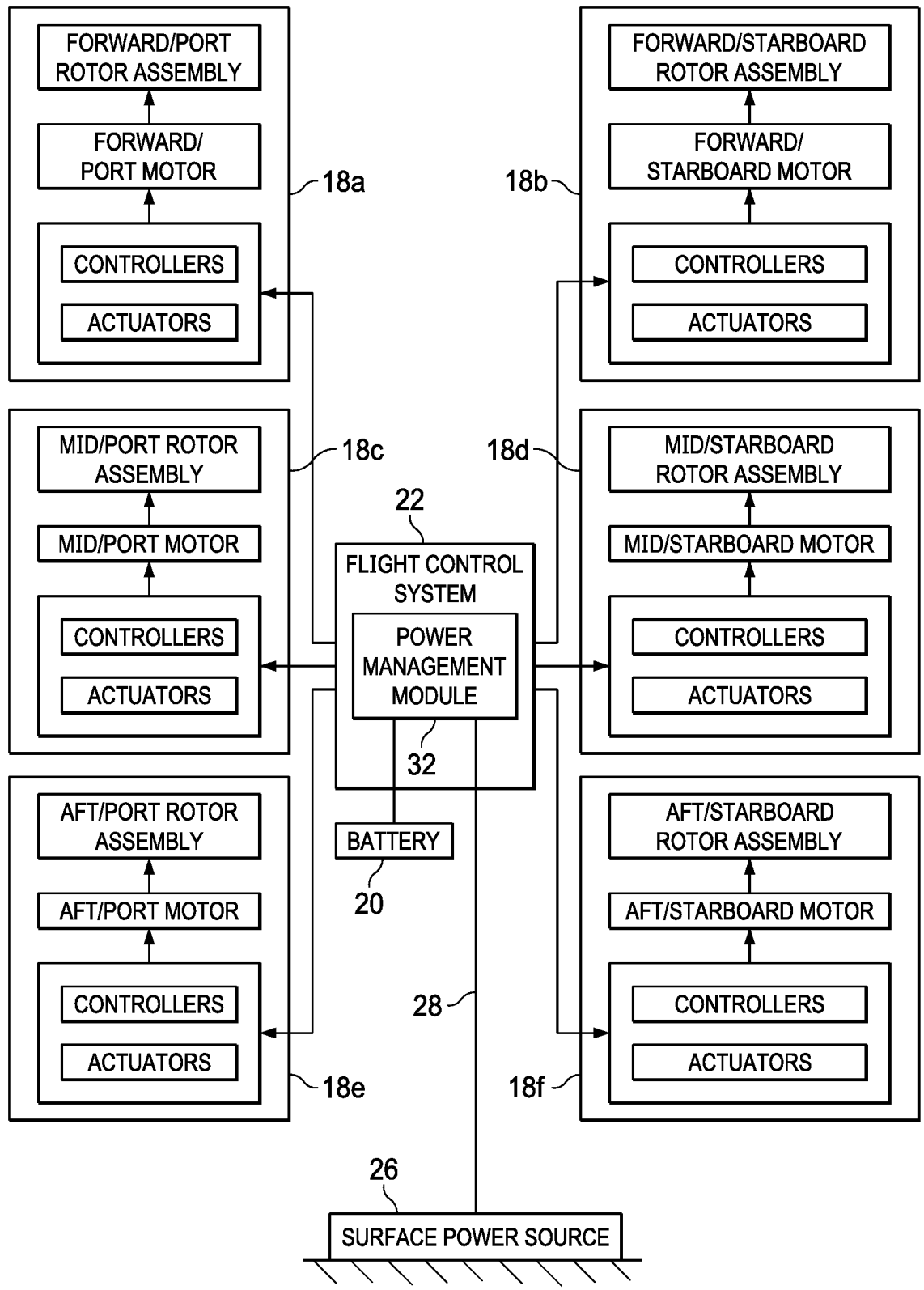

Referring additionally to FIGS. 2A-2B in the drawings, various views of eVTOL aircraft 10 using an electric power tethering system are depicted. As discussed herein, eVTOL aircraft 10 includes flight control system 22 and a two-dimensional distributed thrust array depicted as forward-port rotor system 18a, forward-starboard rotor system 18b, mid-port rotor system 18c, mid-starboard rotor system 18d, aft-port rotor system 18e and aft-starboard rotor system 18f. As best seen in FIG. 2B, each rotor system 18 includes an electronics node depicted as having one or more controllers such as an electronic speed controller and one or more actuators such as a rotor system position actuator and a blade pitch actuator. Each rotor system 18 also includes at least one variable speed electric motor and a rotor assembly coupled to the output drive of the electric motor. As illustrated, rotor systems 18 are ducted rotor systems having variable pitch rotor assemblies with four rotor blades.

The various systems of eVTOL aircraft 10 including rotor systems 18 are powered by battery 20 and surface power source 26. Battery 20 is located onboard eVTOL aircraft 10 while surface power source 26 is disposed on a surface such as land, water or a ground-based structure. Surface power source 26 may include an electrical power grid, a generator, a battery or any combination thereof, and may be stationary or mobile. A power tether 28 transmits power from surface power source 26 to eVTOL aircraft 10 in the takeoff and hover phases of VTOL flight mode, which are typically the most energy-intensive phases of flight for eVTOL aircraft 10. Aircraft end 28a of power tether 28 is configured to couple to surface power inlet 30 of eVTOL aircraft 10 and surface end 28b of power tether 28 is configured to couple to surface power source 26. Power tether 28 is detachable, from either or both of eVTOL aircraft 10 or surface power source 26, to decouple surface power source 26 from eVTOL aircraft 10 in response to a power tether release event during flight such as a conversion from VTOL flight mode to forward flight mode.

Flight control system 22 includes a power management module 32 that allocates power input for eVTOL aircraft 10 from battery 20 and surface power source 26 in the takeoff and hover phases of VTOL flight mode. Power management module 32 determines to what extent, and in what proportion, battery 20 and surface power source 26 provide power to the various systems of eVTOL aircraft 10 while power tether 28 provides electrical communication between surface power source 26 and eVTOL aircraft 10. For example, power management module 32 may use electrical energy from surface power source 26 to fulfill 100%, 50%, 10% or any other proportion of the power needs of eVTOL aircraft 10 in the takeoff and hover phases of VTOL flight mode, with the remainder being fulfilled by battery 20. Depending on the embodiment, electrical power from battery 20 and/or surface power source 26 may or may not be routed through power management module 32.

Figure 3:
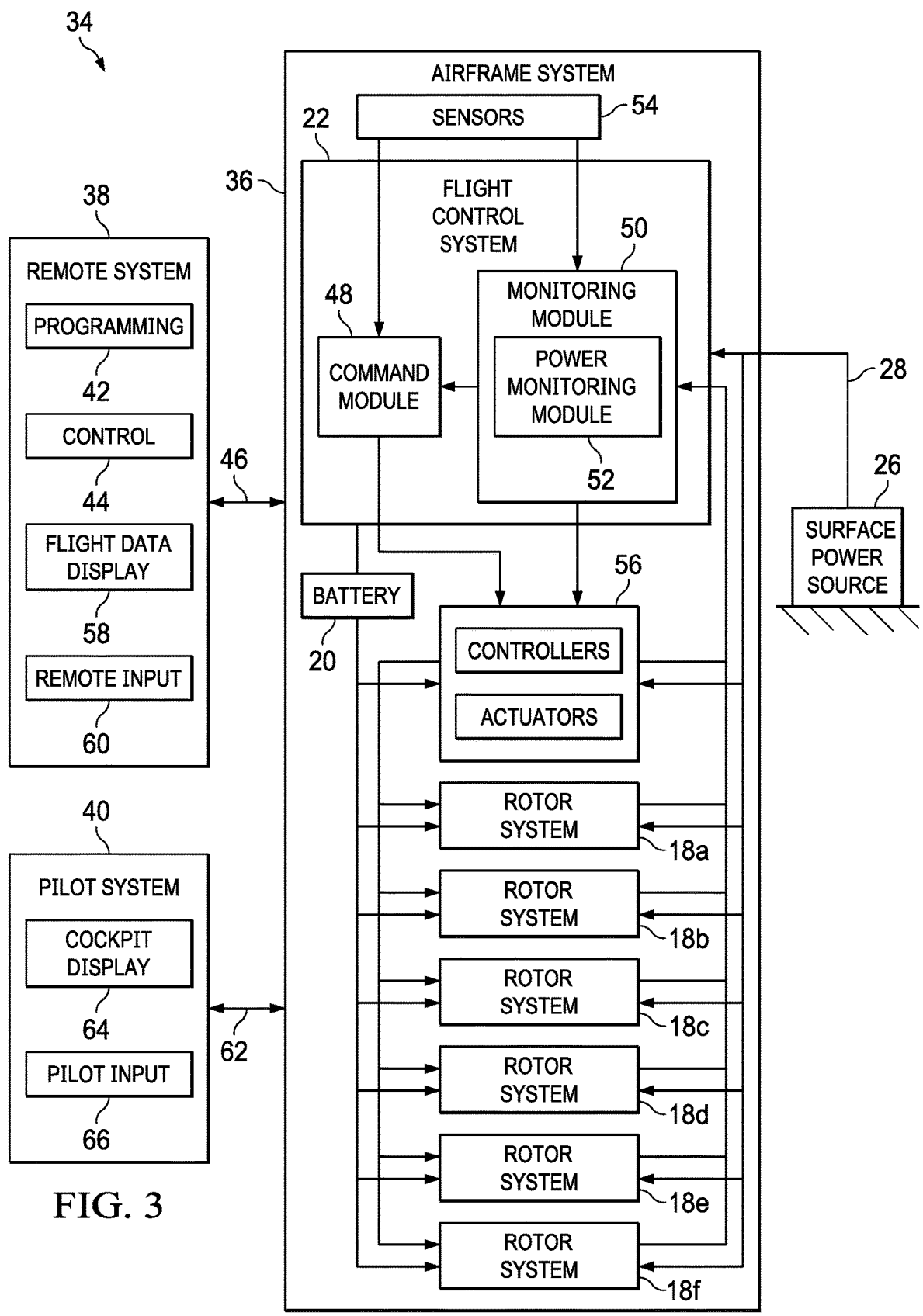
FIG. 3 is a block diagram of control systems for an electric vertical takeoff and landing aircraft for use with an electric power tethering system in accordance with embodiments of the present disclosure.

Referring additionally to FIG. 3 in the drawings, a block diagram depicts a control system 34 operable for use with eVTOL aircraft 10 of the present disclosure. In the illustrated embodiment, control system 34 includes three primary computer-based subsystems; namely, an airframe system 36, a remote system 38 and a pilot system 40. In some implementations, remote system 38 includes a programming application 42 and a remote control application 44. Programming application 42 enables a user to provide a flight plan and mission information to eVTOL aircraft 10 such that flight control system 22 may engage in autonomous control over eVTOL aircraft 10. For example, programming application 42 may communicate with flight control system 22 over a wired or wireless communication channel 46 to provide a flight plan including, for example, a starting point, a trail of waypoints and an ending point such that flight control system 22 may use waypoint navigation during the mission.

In the illustrated embodiment, flight control system 22 is a computer-based system that includes a command module 48 and a monitoring module 50, which includes a power monitoring module 52. It is to be understood by those skilled in the art that these and other modules executed by flight control system 22 may be implemented in a variety of forms including hardware, software, firmware, special purpose processors and combinations thereof. Flight control system 22 receives input from a variety of sources including internal sources such as sensors 54, controllers and actuators 56, rotor systems 18a-18f and external sources such as remote system 38 as well as global positioning system satellites or other location positioning systems and the like. During the various operating modes of eVTOL aircraft 10 including VTOL flight mode, forward flight mode and transitions therebetween, command module 48 provides commands to controllers and actuators 56. These commands enable independent operation of each rotor system 18a-18f including rotor speed and angular position. Flight control system 22 receives feedback from controllers and actuators 56 and rotor systems 18a-18f. This feedback is processed by monitoring module 50 that can supply correction data and other information to command module 48 and/or controllers and actuators 56. For example, power monitoring module 52 may monitor the power consumption of rotor systems 18a-18f and controllers and actuators 56 so that power input from battery 20 and surface power source 26 can be allocated in VTOL flight mode while power tether 28 is connected. Sensors 54, such as vibration sensors, location sensors, attitude sensors, speed sensors, environmental sensors, fuel sensors, temperature sensors and the like also provide information to flight control system 22 to further enhance autonomous control and power allocation capabilities.

Some or all of the autonomous control capability of flight control system 22 can be augmented or supplanted by remote flight control from, for example, remote system 38. Remote system 38 may include one or computing systems that may be implemented on general-purpose computers, special purpose computers or other machines with memory and processing capability. Remote system 38 may be a microprocessor-based system operable to execute program code in the form of machine-executable instructions. In addition, remote system 38 may be connected to other computer systems via a proprietary encrypted network, a public encrypted network, the Internet or other suitable communication network that may include both wired and wireless connections. Remote system 38 communicates with flight control system 22 via communication link 46 that may include both wired and wireless connections.

While operating remote control application 44, remote system 38 is configured to display information relating to one or more aircraft of the present disclosure on one or more flight data display devices 58. Remote system 38 may also include audio output and input devices such as a microphone, speakers and/or an audio port allowing an operator to communicate with other operators, a base station and/or a pilot onboard eVTOL aircraft 10. The display device 58 may also serve as a remote input device 60 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of eVTOL aircraft 10 can be augmented or supplanted by onboard pilot flight control from pilot interface system 40 that includes one or more computing systems that communicate with flight control system 22 via one or more wired communication channels 62. Pilot system 40 preferably includes one or more cockpit display devices 64 configured to display information to the pilot. Cockpit display device 64 may be configured in any suitable form including, for example, a display panel, a dashboard display, an augmented reality display or the like. Pilot system 40 may also include audio output and input devices such as a microphone, speakers and/or an audio port allowing an onboard pilot to communicate with, for example, air traffic control. Pilot system 40 also includes a plurality of user interface devices 66 to allow an onboard pilot to provide control commands to eVTOL aircraft 10 including, for example, a control panel with switches or other inputs, mechanical control devices such as steering devices or sticks as well as other control devices.

Figure 4C:
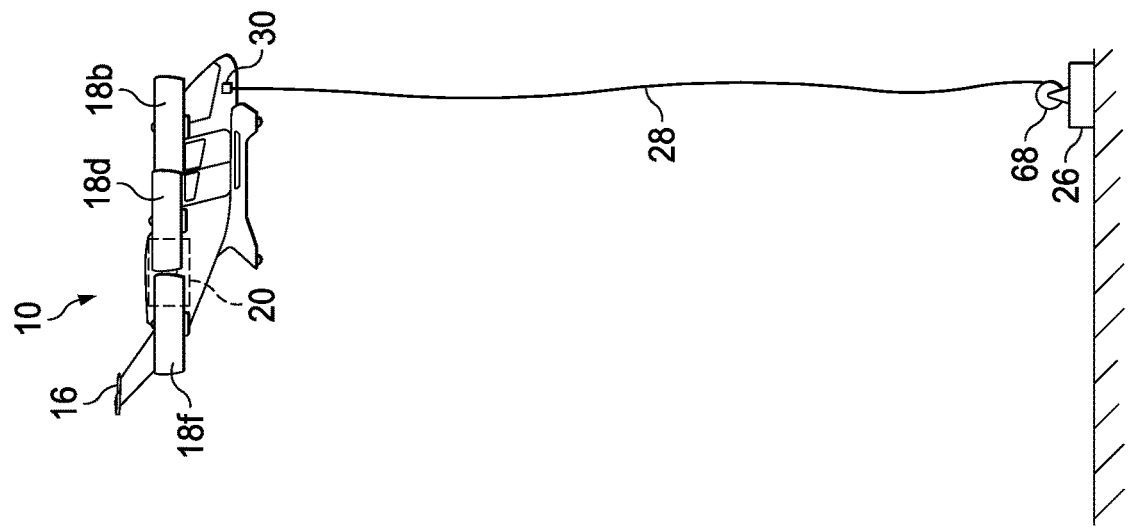
FIGS. 4A-4J are schematic illustrations and a power consumption graph of an aircraft using an electric power tethering system in a sequential flight operating scenario in accordance with embodiments of the present disclosure.
Figure 4B:
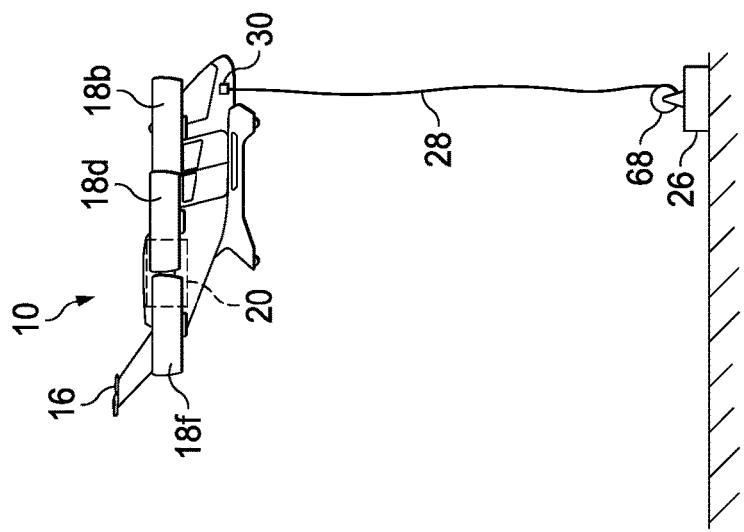
Figure 4A:
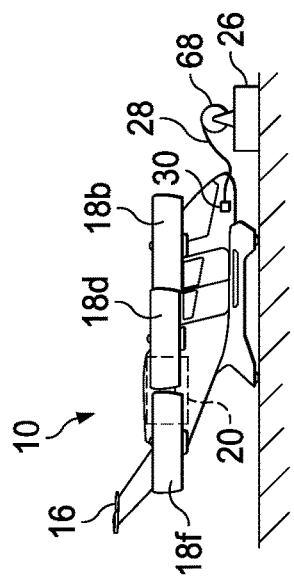

Referring additionally to FIGS. 4A-4J in the drawings, a sequential flight operating scenario of eVTOL aircraft 10 using an electric power tethering system is depicted. As best seen in FIG. 4A, eVTOL aircraft 10 is positioned on the ground prior to takeoff. When eVTOL aircraft 10 is ready for a mission, flight control system 22 commences operations to provide flight control to eVTOL aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight.

In some embodiments, power tether 28 transmits electrical power from surface power source 26 to eVTOL aircraft 10 while eVTOL aircraft 10 is on the ground to charge battery 20 prior to takeoff. The surface end of power tether 28 is wrapped around a retraction spool 68 to take out slack in power tether 28. Alternatively, power tether 28 may be laid out along a planned flight path and looped back to the takeoff location of eVTOL aircraft 10. Retraction spool 68 is rotatable to either extend or retract power tether 28, and, in some embodiments, may be biased to retract power tether 28. While surface power source 26 is depicted as being disposed on a ground surface, surface power source 26 may also be disposed on the top of a building, tower or other elevated structure on which eVTOL aircraft 10 may land.

In FIGS. 4B-4C, eVTOL aircraft 10 is taking off, starting with a lift to hover (FIG. 4B), and moving to an out of ground effect hover (FIG. 4C) of VTOL flight mode while engaging thrust-borne lift. As illustrated, the rotor assemblies of each rotor system 18 are rotating in the same horizontal plane forming a two-dimensional distributed thrust array of six rotor systems. As the longitudinal axis and the lateral axis of eVTOL aircraft 10 are both in the horizontal plane, eVTOL aircraft 10 has a generally level flight attitude. During the hover phase in FIG. 4C, flight control system 22 may utilize the individual thrust control capabilities of rotor systems 18 to control flight dynamics to maintain hover stability and to provide pitch, roll and yaw authority for eVTOL aircraft 10. More specifically, as each rotor system 18 may be independently controllable, operational changes to certain rotor systems 18 enable pitch, roll and yaw control of eVTOL aircraft 10 during VTOL operations.

Figure 4D:
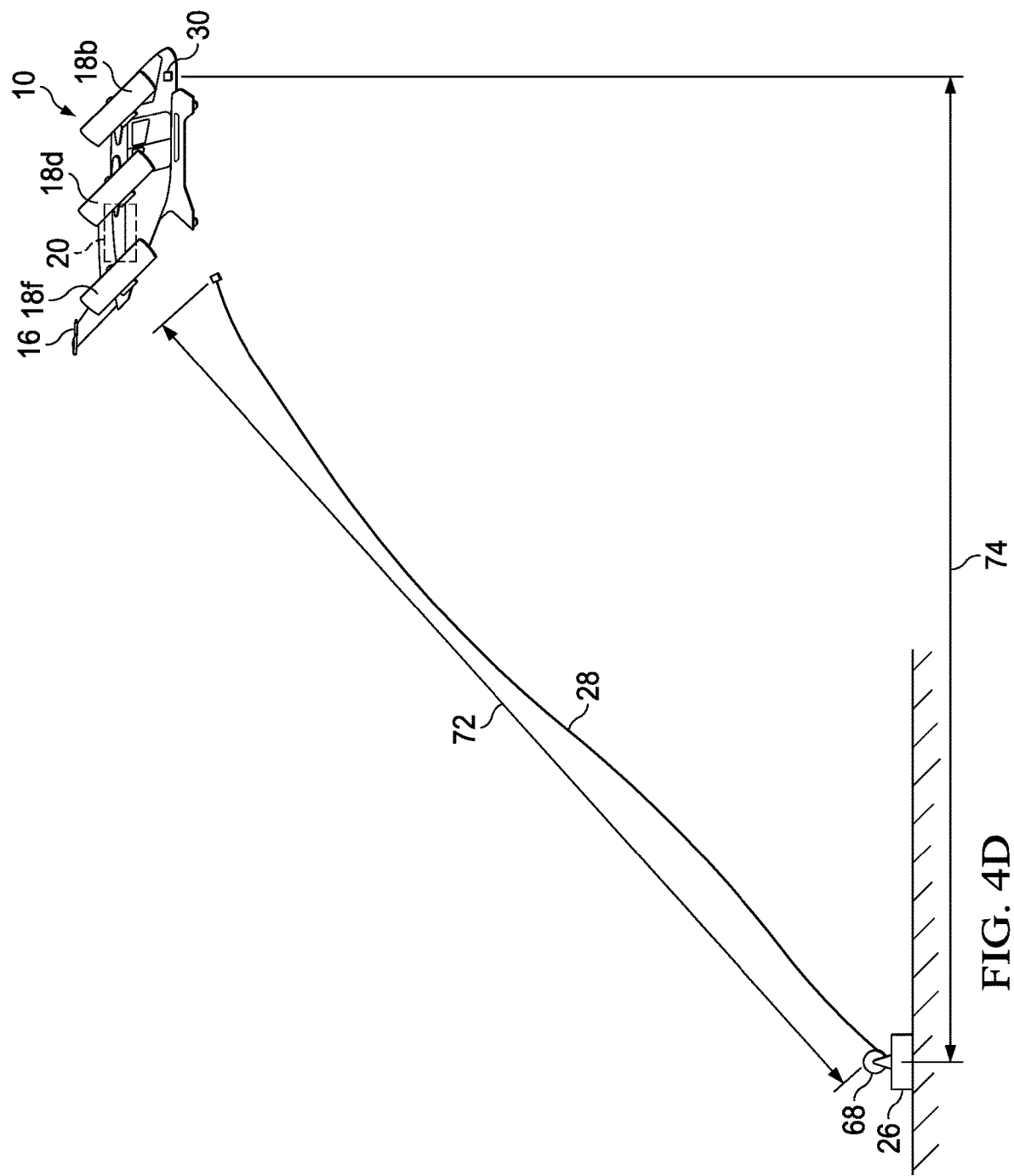
Figure 4E:
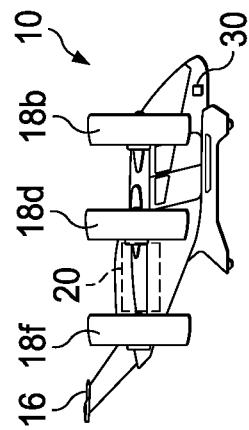
Figure 4E:
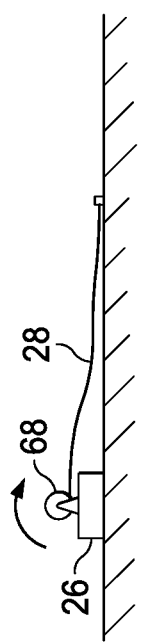
Figure 4F:
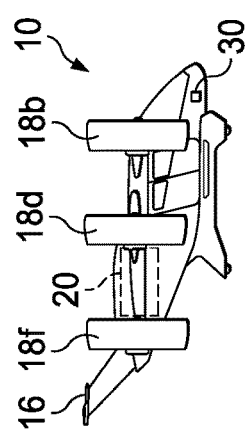
Figure 4G:
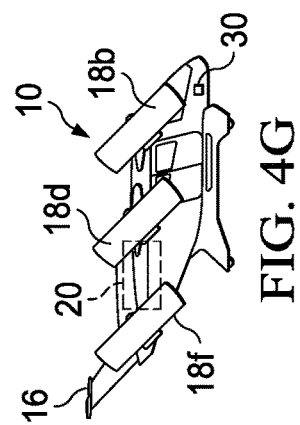
Figure 4H:
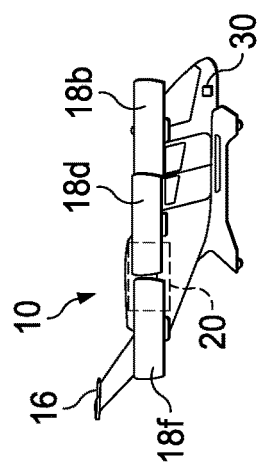
Figure 4I:
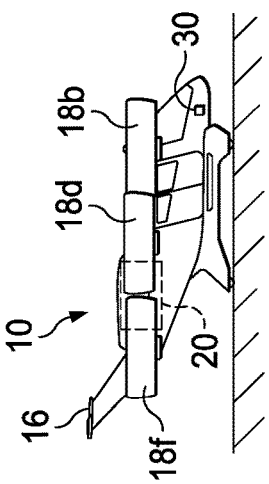
Figure 4J:
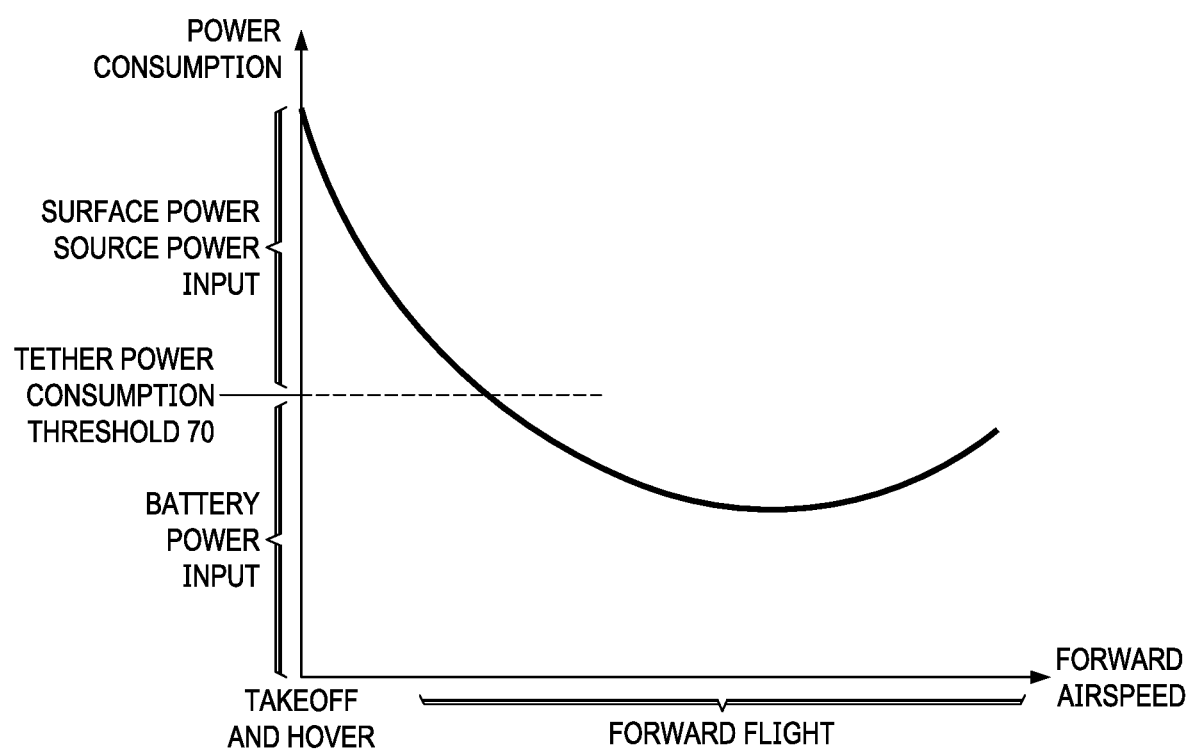

As best seen in FIG. 4J, which plots the power consumption of eVTOL aircraft 10 versus forward airspeed, the takeoff climb and hover phases of flight are the most energy-intensive phases of the mission of eVTOL aircraft 10. The high level of power consumption during the takeoff and hover phases compromises the amount of energy of battery 20 that is available for the mission. For example, at peak power consumption thermal waste occurs in battery 20, which forces a larger battery size in eVTOL aircraft 10 and disproportionately reduces remaining battery energy. The illustrative embodiments address these issues by utilizing an electric power tethering system from which eVTOL aircraft 10 draws power from power tether 28 during the most energy-intensive phases of flight (i.e., the takeoff and hover phases). As eVTOL aircraft 10 rises in takeoff phase, power tether 28 is unwound from retraction spool 68 so that a power connection can be maintained between eVTOL aircraft 10 and surface power source 26. This power connection may remain plugged into eVTOL aircraft 10 while eVTOL aircraft 10 remains within tether length.

In the takeoff and hover phases, power management module 32 may allocate power input from battery 20 and surface power source 26 in numerous ways depending on the embodiment. In the illustrated embodiment, as best seen in FIG. 4J, power management module 32 executes a power sharing regime in which battery 20 and surface power source 26 share the load at peak demand. In this embodiment, surface power source 26 provides power for eVTOL aircraft 10 in excess of a tether power consumption threshold 70. In the power sharing regime, both battery 20 and surface power source 26 may jointly power each and all of the systems of eVTOL aircraft 10. Alternatively, some systems of eVTOL aircraft 10 may be powered exclusively by battery 20 while other systems of eVTOL aircraft 10 are powered exclusively by surface power source 26. For example, rotor systems 18 may be powered by surface power source 26 while the other systems of eVTOL aircraft 10 such as flight control system 22 may be powered by battery 20. In yet other embodiments, while eVTOL aircraft 10 is in the takeoff, hover and initial forward acceleration phases, surface power source 26 may provide all (100%) of the power consumed by eVTOL aircraft 10. Indeed, surface power source 26 may provide any proportion of the power consumption of eVTOL aircraft 10 while power tether 28 connects surface power source 26 to eVTOL aircraft 10. Also, surface power source 26 may charge battery 20 while eVTOL aircraft 10 is airborne.

The electric power tethering system of the illustrative embodiments helps to level, reduce or even eliminate the power draw on battery 20 while eVTOL aircraft 10 operates in the high power flight regime of takeoff, hover and/or low forward speed flight. Several benefits accrue to eVTOL aircraft 10 as a result of this reduced power draw on battery 20. For example, eVTOL aircraft 10 may utilize a smaller battery, resulting in eVTOL aircraft 10 being lighter and less expensive. The energy of battery 20 is also extended, which extends the flight range of eVTOL aircraft 10 and enables better prediction of flight endurance, or time aloft. The payload onboard eVTOL aircraft 10 may be increased due to the reduced size and weight of battery 20. With this approach, thermal waste within battery 20 (at high power draw) may be avoided. Because eVTOL aircraft 10 draws power from surface power source 26 during the hover phase, eVTOL aircraft 10 may hover for a longer amount of time, during which more thorough and/or longer aircraft system checks such as rotor checks may be performed, thereby offering safety advantages to eVTOL aircraft 10 without incurring payload or range penalties.

Returning to the sequential flight operating scenario of eVTOL aircraft 10, after vertical ascent to the desired elevation, eVTOL aircraft 10 may begin the transition from thrust-borne lift to wing-borne lift. As best seen from the progression of FIGS. 4C-4E, the angular positions of rotor systems 18 are changed by a pitch down rotation to transition eVTOL aircraft 10 from the VTOL flight mode toward the lower power forward flight mode. As seen in FIG. 4D, rotor systems 18 have been collectively inclined about forty-five degrees pitch down. In the conversion orientations of eVTOL aircraft 10, a portion of the thrust generated by rotor systems 18 provides lift while a portion of the thrust generated by rotor systems 18 urges eVTOL aircraft 10 to accelerate in the forward direction such that the forward airspeed of eVTOL aircraft 10 increases allowing wings 14*a*, 14*b* to offload a portion and eventually all of the lift requirement from rotor systems 18. Power tether 28 may remain connected to eVTOL aircraft 10 during all or a portion of the transition from the VTOL flight mode to the forward flight mode, including while the angular positions of rotor systems 18 are in a conversion orientation.

As seen in FIG. 4J, as eVTOL aircraft 10 gains forward airspeed, the power consumption of eVTOL aircraft 10 decreases. Since eVTOL aircraft 10 is travelling away from surface power source 26, the reach of power tether 28 will eventually be exceeded. Thus, power tether 28 is detachable from eVTOL aircraft 10 to decouple surface power source 26 from surface power inlet 30 of eVTOL aircraft 10 in response to a power tether release event during flight. The power tether release event that causes power tether 28 to detach from eVTOL aircraft 10 varies depending on the embodiment. In some embodiments, the conversion of rotor systems 18 from the horizontal orientation of FIG. 4C to the vertical orientation of FIG. 4E constitutes the power tether release event. In other embodiments, power tether 28 may have a power tether extension distance threshold 72 that, if exceeded, causes power tether 28 to detach from eVTOL aircraft 10. Power tether 28 may also detach from eVTOL aircraft 10 if eVTOL aircraft 10 exceeds a ground distance threshold 74 from surface power source 26. In yet other embodiments, the power tether release event may occur when the power consumption of eVTOL aircraft 10 falls below tether power consumption threshold 70. The power tether release event may also be a manual user command from the pilot, ground personnel or from elsewhere.

As best seen in FIGS. 4E-4F, rotor systems 18 have been collectively inclined about ninety degrees pitch down such that the rotor assemblies are rotating in vertical planes providing forward thrust for eVTOL aircraft 10 with wings 14*a*, 14*b* providing lift. Even though the conversion from the VTOL orientation to the forward flight orientation of eVTOL aircraft 10 has been described as progressing with collective pitch down rotation of rotor systems 18, in other implementations, all rotor systems 18 need not be operated at the same time or at the same rate. The aircraft end of power tether 28 has fallen to the ground after being released from eVTOL aircraft 10. Retraction spool 68 rotates to wind power tether 28 thereon. In other embodiments, power tether 28 need not be retracted by retraction spool 68 and may be manually gathered toward surface power source 26.

As forward flight with wing-borne lift requires significantly less thrust than VTOL flight with thrust-borne lift, the operating speed of some or all of rotor systems 18 may be reduced, particularly in embodiments having collective blade pitch control. In certain embodiments, some of rotor systems 18 of eVTOL aircraft 10 could be shut down during forward flight. Thus, the overall power consumption of eVTOL aircraft 10 is reduced as shown in FIG. 4J and there is no need for surface power source 26. In the forward flight orientation, the independent rotor speed control provided by flight control system 22 over each rotor system 18 may provide yaw authority for eVTOL aircraft 10. In the forward flight orientation, pitch and roll authority is preferably provided by the ailerons and/or elevators on wings 14*a*, 14*b* and/or tail assembly 16.

As eVTOL aircraft 10 approaches its destination, eVTOL aircraft 10 may begin its transition from wing-borne lift to thrust-borne lift. As best seen from the progression of FIGS. 4F-4H, the angular positions of rotor systems 18 are changed by a pitch up rotation to transition eVTOL aircraft 10 from the forward flight orientation toward the VTOL orientation.

As seen in FIG. 4G, rotor systems 18 have been collectively inclined about forty-five degrees pitch up. In the conversion orientations of eVTOL aircraft 10, a portion of the thrust generated by rotor systems 18 begins to provide lift for eVTOL aircraft 10 as the forward airspeed decreases and the lift producing capability of wings 14*a*, 14*b* decreases. As best seen in FIG. 4H, rotor systems 18 have been collectively inclined about ninety degrees pitch up such that the rotor assemblies are rotating in the horizontal plane providing thrust-borne lift for eVTOL aircraft 10. Even though the conversion from the forward flight orientation to the VTOL orientation of eVTOL aircraft 10 has been described as progressing with collective pitch up rotation of rotor systems 18, in other implementations, all rotor systems 18 need not be operated at the same time or at the same rate. Once eVTOL aircraft 10 has completed the transition to the VTOL orientation, eVTOL aircraft 10 may commence its vertical descent to a surface. As best seen in FIG. 4I, eVTOL aircraft 10 has landed at the destination location. Surface power source 26 may be reconnected to eVTOL aircraft 10 to recharge battery 20 after landing.

It should be appreciated that eVTOL aircraft 10 is merely illustrative of a variety of aircraft that can implement the embodiments disclosed herein. Indeed, the electric power tethering system may be implemented on any aircraft that uses electric power for takeoff. Other aircraft implementations can include helicopters, hybrid aircraft, non-hovering winged aircraft, tiltwing aircraft, tiltrotor aircraft, quad tiltrotor aircraft, unmanned aircraft, gyrocopters, compound helicopters, drones and the like. As such, those skilled in the art will recognize that the electric power tethering system can be integrated into a variety of aircraft configurations. For example, the electric power tethering system may also be implemented on electrically powered aircraft that takeoff horizontally from a runway. It should be appreciated that even though aircraft are particularly well-suited to implement the embodiments of the present disclosure, non-aircraft vehicles and devices can also implement the embodiments.

Figure 5B:
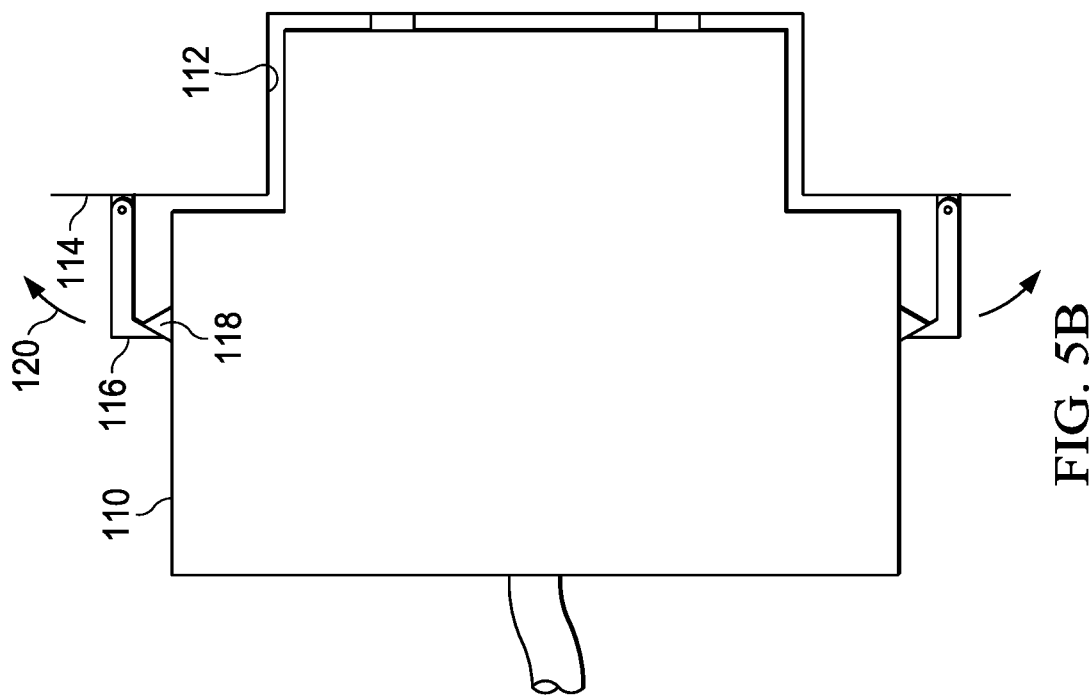
FIGS. 5A-5B are schematic illustrations of a plug-and-socket power connection between a surface power inlet of an aircraft and a power tether in accordance with embodiments of the present disclosure.
Figure 5A:
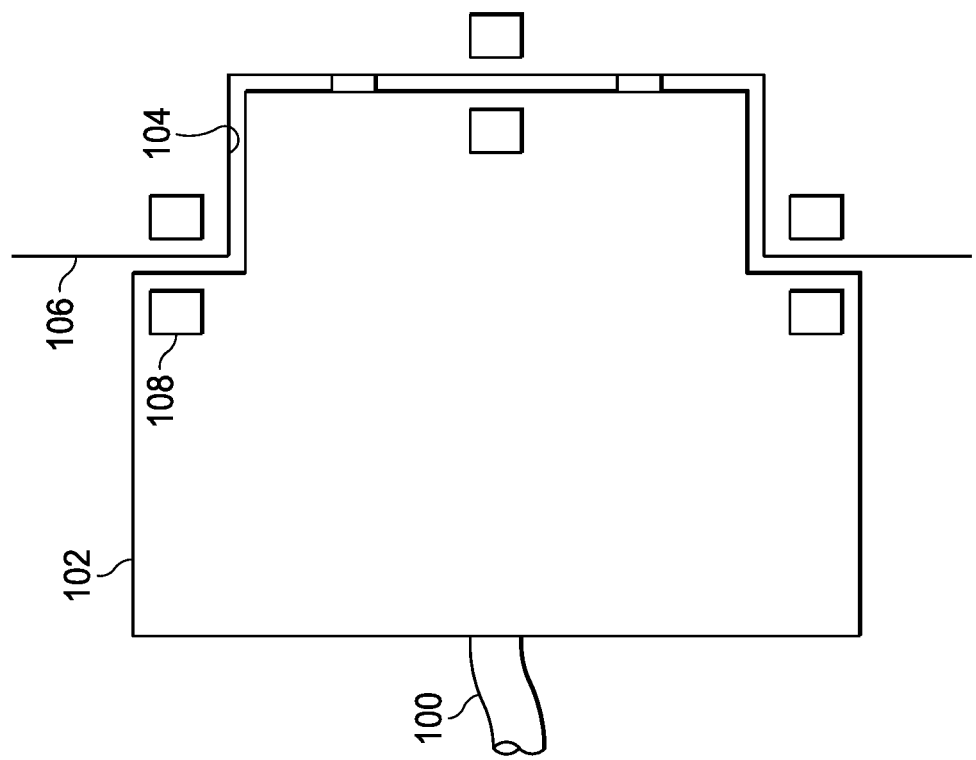

Referring to FIGS. 5A-5B in the drawings, various types of connections between a power tether and an aircraft are schematically illustrated. In FIG. 5A, the aircraft end of power tether 100 forms a plug 102 that fits into a socket 104 of surface power inlet 106. Surface power inlet 106 may be located anywhere on the outer surface of an aircraft such as on the skin of the fuselage. Plug 102 is held in socket 104 by magnets 108 contained in or on plug 102 and surface power inlet 106. Magnets 108 prevent plug 102 from detaching from the aircraft while the aircraft relies on the electrical power provided via power tether 100. Plug 102 and socket 104 may contain any number of magnets. In FIG. 5B, plug 110 is coupled to socket 112 of surface power inlet 114 using clamps 116. Clamps 116 are rotatably coupled to surface power inlet 114 and latch onto studs 118 of plug 110. When it is desired to release plug 110 from socket 112, clamps 116 may rotate in an outward direction 120 to release plug 110 from socket 112. The clamp configurations that may be used to couple plug 110 to socket 112 are numerous. FIGS. 5A-5B both illustrate fail-safe mechanisms that help to prevent the power tether from breaking, leaking or interfering with the flight of the aircraft. In other embodiments, the aircraft end of the power tether may be coupled to the aircraft using friction alone.

Figure 6A:
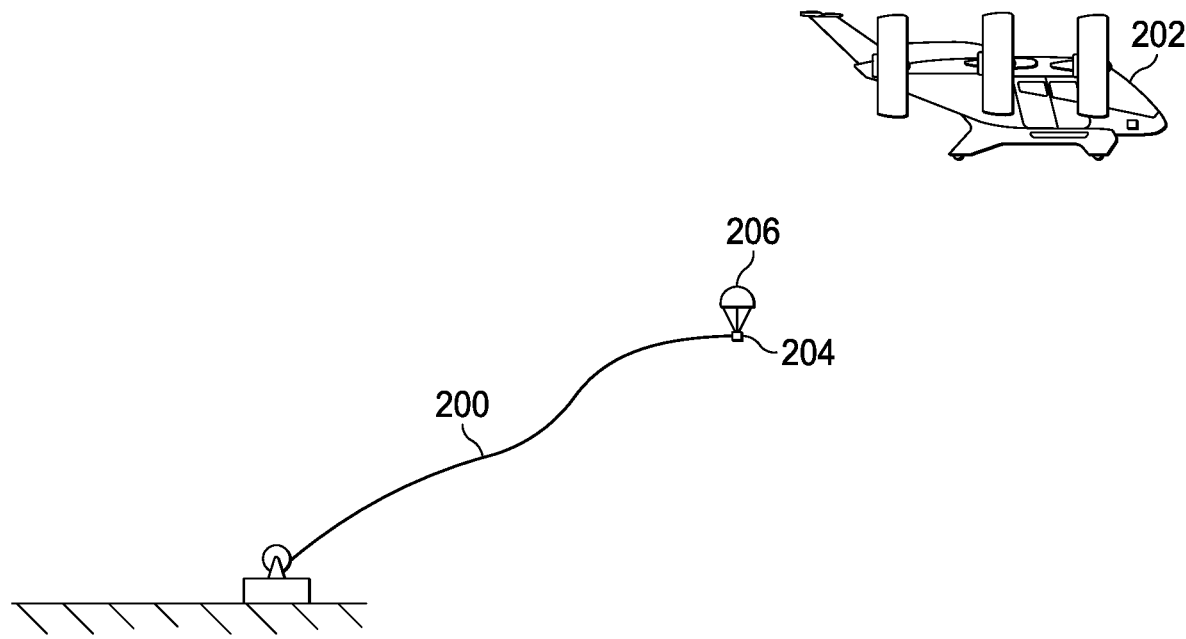
FIGS. 6A-6B are schematic illustrations of electric power tethering systems having controlled-descent power tethers in accordance with embodiments of the present disclosure.
Figure 6B:
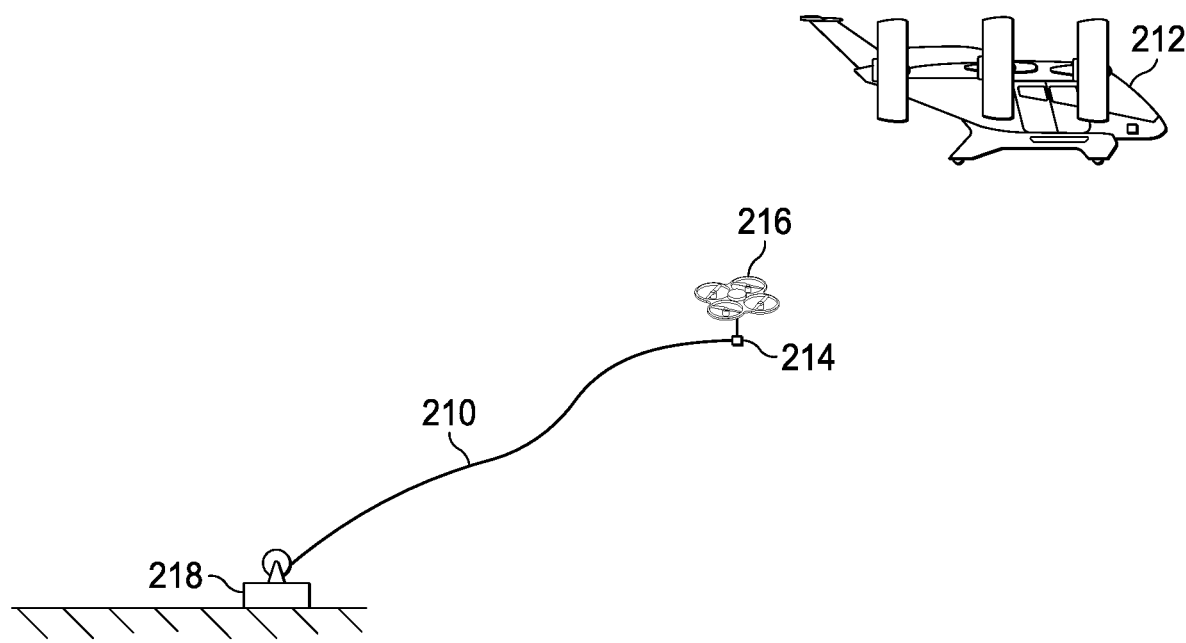

Referring to FIGS. 6A-6B in the drawings, electric power tethering systems having different controlled-descent power tethers are depicted. In FIG. 6A, power tether 200 has detached from aircraft 202. Aircraft end 204 of power tether 200 includes a parachute 206 to control the descent of aircraft end 204 of power tether 200 to the ground after detachment. In some embodiments, parachute 206 may be folded into a compartment of aircraft end 204 of power tether 200 while not in use and may be deployed after detachment as shown in FIG. 6A. In FIG. 6B, power tether 210 has detached from aircraft 212 and aircraft end 214 of power tether 210 is guided downward by an unmanned tether guidance drone 216. Tether guidance drone 216 allows for increased directional control of aircraft end 214 of power tether 210 as compared to parachute 206 in FIG. 6A. For example, tether guidance drone 216 may not only control the descent of aircraft end 214 of power tether 210 but also may fly aircraft end 214 of power tether 210 in a lateral direction toward surface power source 218. Tether guidance drone 216 may either remain attached to aircraft end 214 of power tether 210 while power tether 210 is attached to aircraft 212 or may fly independently and retrieve aircraft end 214 of power tether 210 just before detachment. In yet other embodiments, tether guidance drone 216 may be used to lift aircraft end 214 of power tether 210 upward toward aircraft 212 to provide electrical power thereto such as in the case of an emergency, low battery charge or maneuver assistance.

Figure 7C:
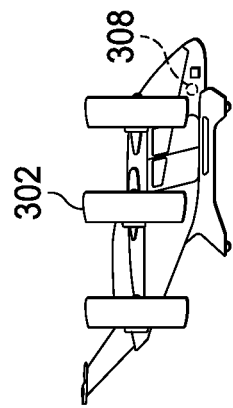
FIGS. 7A-7C are schematic illustrations of an aircraft using an electric power tethering system with a power tether retractable into the aircraft in a sequential flight operating scenario in accordance with embodiments of the present disclosure.
Figure 7B:
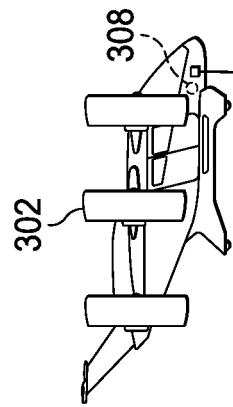
Figure 7A:
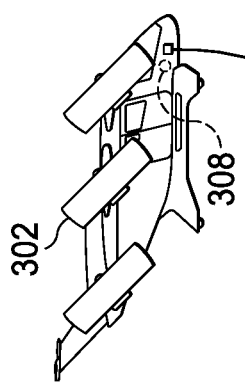

Referring to FIGS. 7A-7C in the drawings, a sequential flight operating scenario is illustrated in which an electric power tethering system includes power tether 300, which is retractable into aircraft 302. In FIG. 7A, power tether 300 provides power from surface power source 304 to aircraft 302. In FIG. 7B, surface end 306 of power tether 300 is detached from surface power source 304 in response to a power tether release event. Power tether 300 is retracted into aircraft 302 by a retraction spool 308 configured to retract power tether 300. In FIG. 7C, power tether 300 has been completely retracted into aircraft 302. Aircraft 302 may lower power tether 300 any time supplemental power is needed from surface power source 304. For example, aircraft 302 may convert into VTOL flight mode and hover above surface power source 304, where aircraft 302 may lower power tether 300 to receive additional power.

Figure 8A:
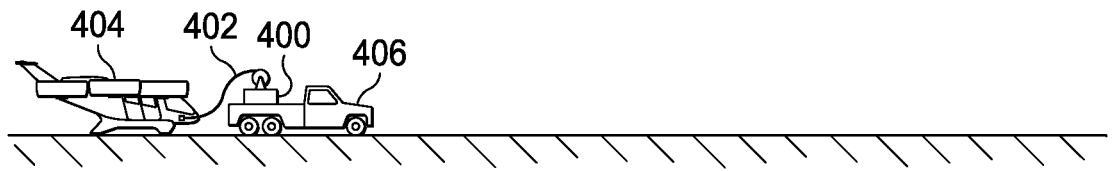
FIGS. 8A-8D are schematic illustrations of an aircraft using an electric power tethering system with a mobile and land-based surface power source in a sequential flight operating scenario in accordance with embodiments of the present disclosure.
Figure 8B:
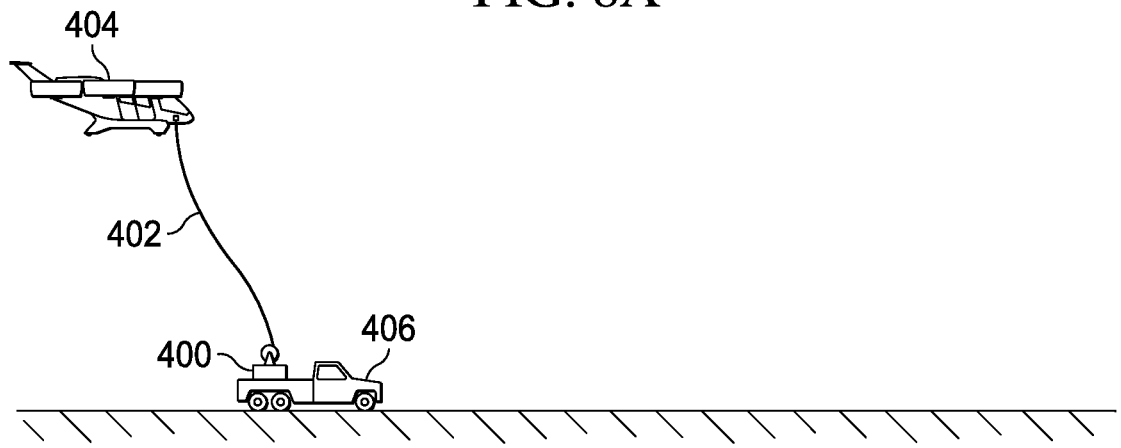
Figure 8C:
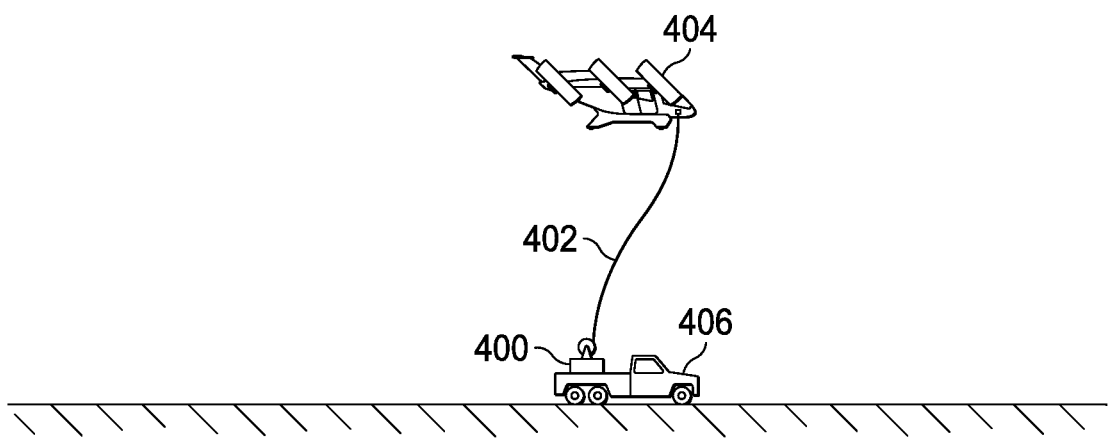
Figure 8D:
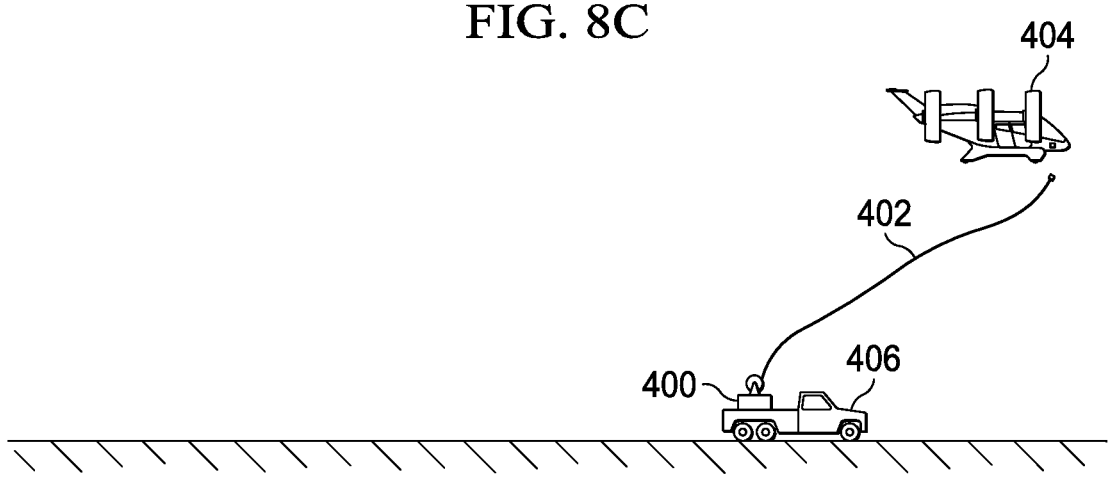

Referring to FIGS. 8A-8D in the drawings, a sequential flight operating scenario is depicted in which an electric power tethering system includes a mobile surface power source 400. Mobile surface power source 400 moves along the ground while power tether 402 couples mobile surface power source 400 to aircraft 404. The electric power tethering system includes a land vehicle 406 such as a truck to transport mobile surface power source 400 along the ground. Land vehicle 406 may remain stationary as aircraft 404 takes off and hovers as shown in FIGS. 8A-8B. Land vehicle 406 moves in the same direction as aircraft 404 as aircraft 404 converts into and flies in forward flight mode as shown in FIGS. 8C-8D. Using a mobile, instead of stationary, surface power source increases the range within which mobile surface power source 400 can provide power to aircraft 404. Land vehicle 406 may be manned or unmanned and remotely controlled. Mobile surface power source 400 may include a generator, battery or other mobile power source.

Figure 9A:
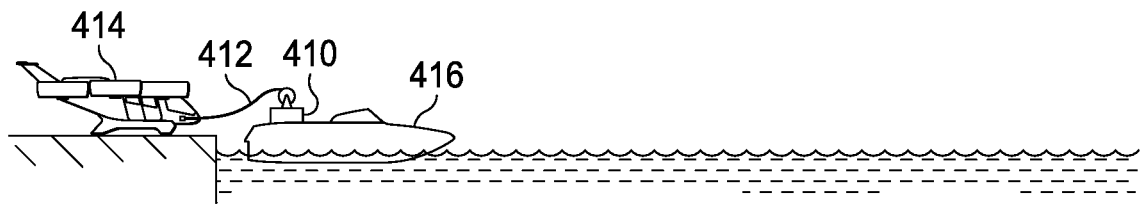
FIGS. 9A-9D are schematic illustrations of an aircraft using an electric power tethering system with a mobile and water-based surface power source in a sequential flight operating scenario in accordance with embodiments of the present disclosure.
Figure 9B:
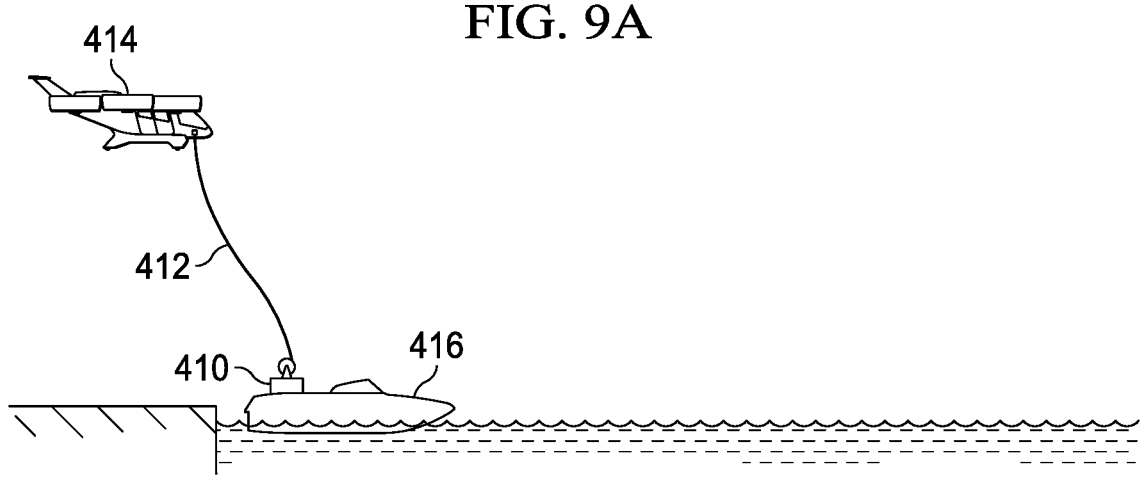
Figure 9C:
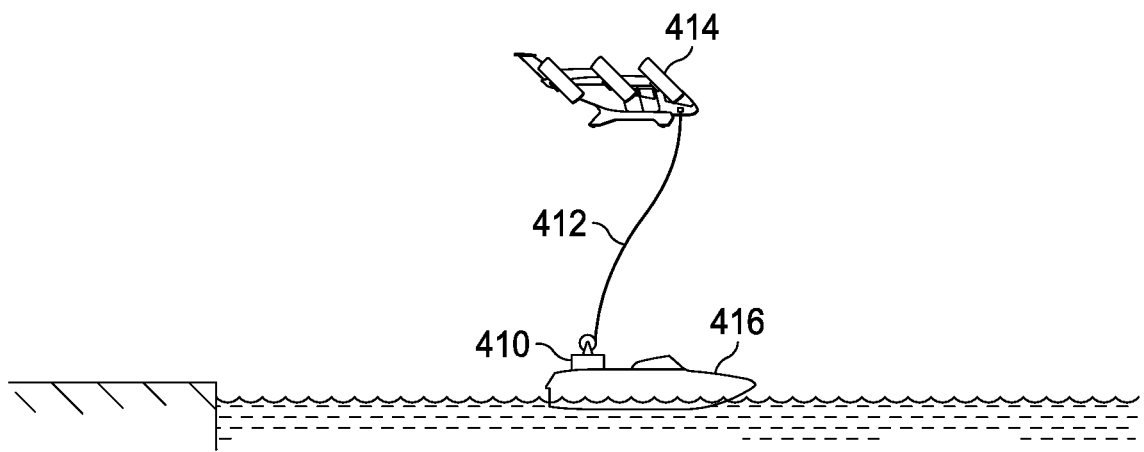
Figure 9D:
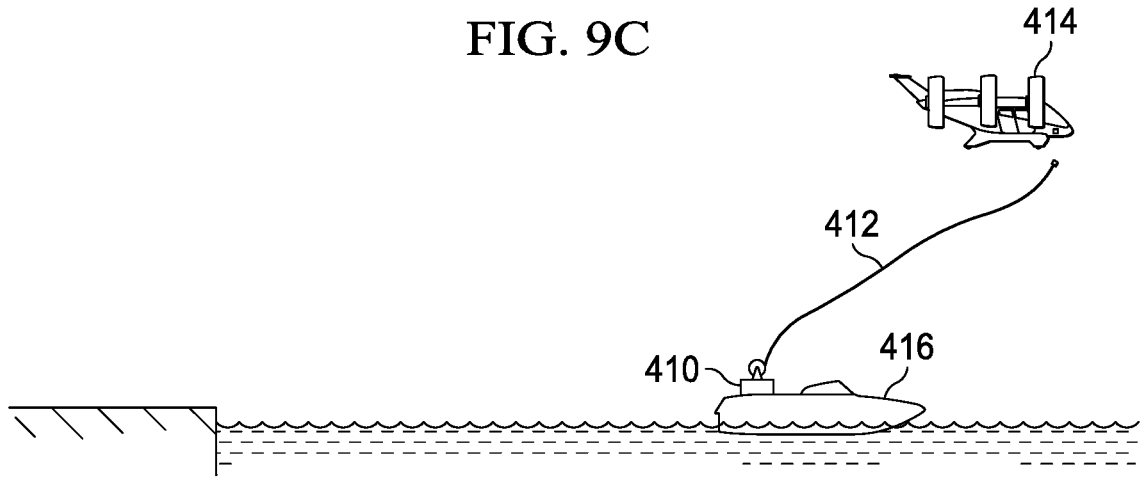

Referring to FIGS. 9A-9D in the drawings, a sequential flight operating scenario is depicted in which an electric power tethering system includes a mobile surface power source 410. Mobile surface power source 410 moves along a body of water while power tether 412 couples mobile surface power source 410 to aircraft 414. The electric power tethering system includes a water vehicle 416 such as a boat or aircraft carrier to transport mobile surface power source 410 along a water surface. As shown in FIGS. 9A-9B, water vehicle 416 may remain stationary as aircraft 414 takes off and hovers from a shoreline or launch platform such as an elevated offshore oil platform. Water vehicle 416 moves in the same direction as aircraft 414 as aircraft 414 converts into and flies in forward flight mode as shown in FIGS. 9C-9D. Using a mobile, instead of stationary, surface power source increases the range within which mobile surface power source 410 can provide power to aircraft 414, including over a body of water such as an ocean, sea or lake. Water vehicle 416 may be manned or unmanned and remotely controlled. Mobile surface power source 410 may include a generator, battery or other mobile power source.

Figure 10A:
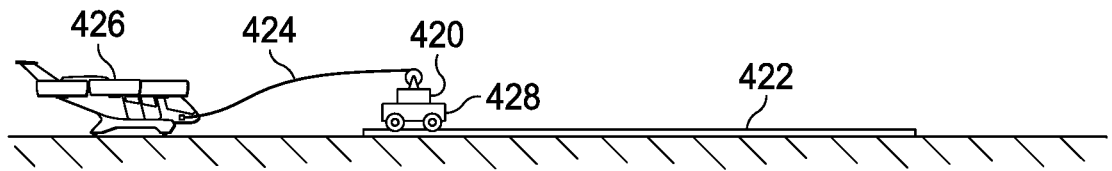
FIGS. 10A-10D are schematic illustrations of an aircraft using an electric power tethering system with a mobile and track-based surface power source in a sequential flight operating scenario in accordance with embodiments of the present disclosure.
Figure 10B:
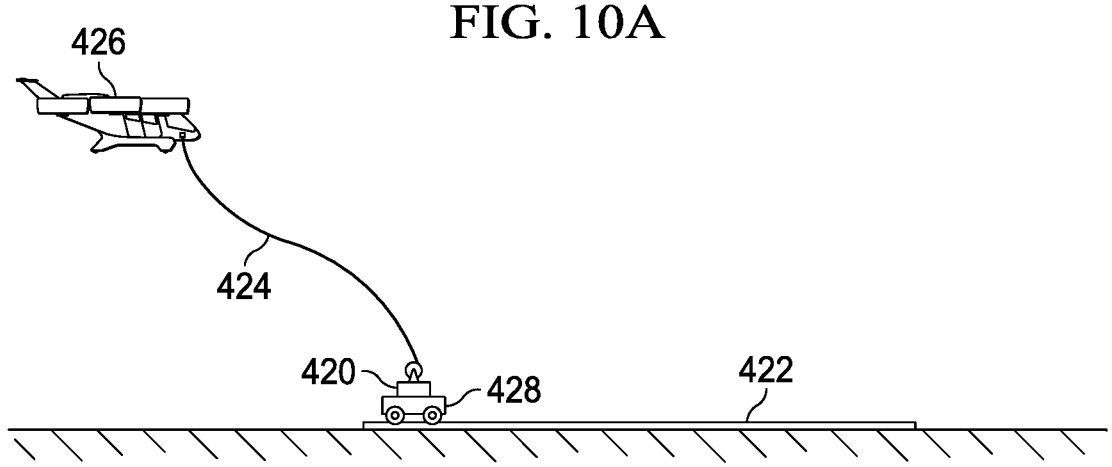
Figure 10C:
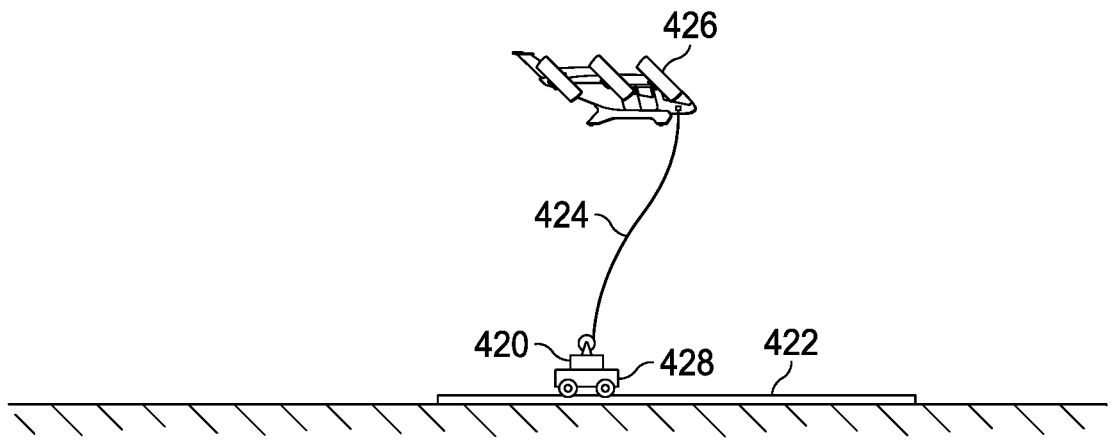
Figure 10D:
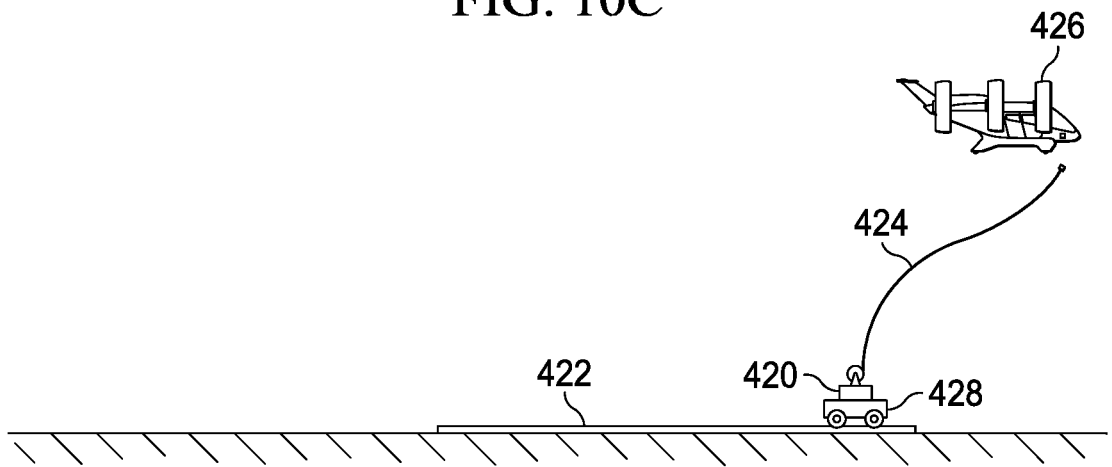

Referring to FIGS. 10A-10D in the drawings, a sequential flight operating scenario is depicted in which an electric power tethering system includes a mobile surface power source 420. Mobile surface power source 420 moves along a set of tracks 422 such as railroad tracks while power tether 424 couples mobile surface power source 420 to aircraft 426. The electric power tethering system includes a vehicle 428 capable of moving along tracks 422 to transport mobile surface power source 420. Vehicle 428 may remain stationary as aircraft 426 takes off and hovers as shown in FIGS. 10A-10B. In some implementations, aircraft 426 may take off while power tether 424 is substantially extended as shown in FIG. 10A to increase the overall range that mobile surface power source 420 can provide power to aircraft 426 from takeoff until detachment. Vehicle 428 moves in the same direction as aircraft 426 as aircraft 426 converts into and flies in forward flight mode as shown in FIGS. 10C-10D. Using a mobile, instead of stationary, surface power source increases the range within which mobile surface power source 420 can provide power to aircraft 426. Vehicle 428 may be manned or unmanned and remotely controlled. Mobile surface power source 420 may include a generator, battery or other mobile power source, or may be an extension of a power grid. In some embodiments, mobile surface power source 420 may instead be a mobile aerial power source that is carried by a manned or unmanned aerial vehicle, thereby providing extended range within which supplemental power is transmitted to aircraft 426.

Figure 11A:
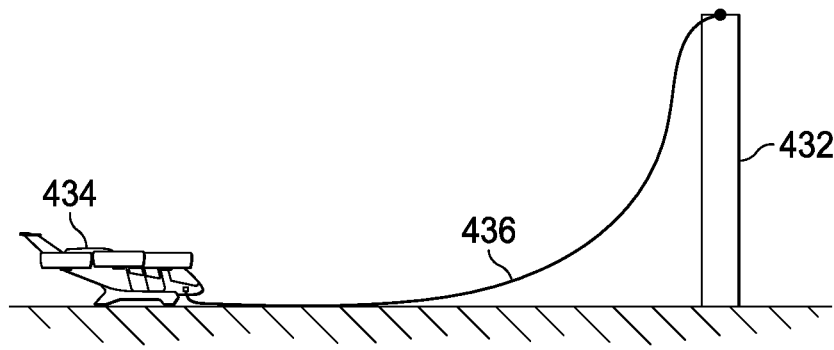
FIGS. 11A-11D are schematic illustrations of an aircraft using an electric power tethering system with a tower power source in a sequential flight operating scenario in accordance with embodiments of the present disclosure.
Figure 11B:
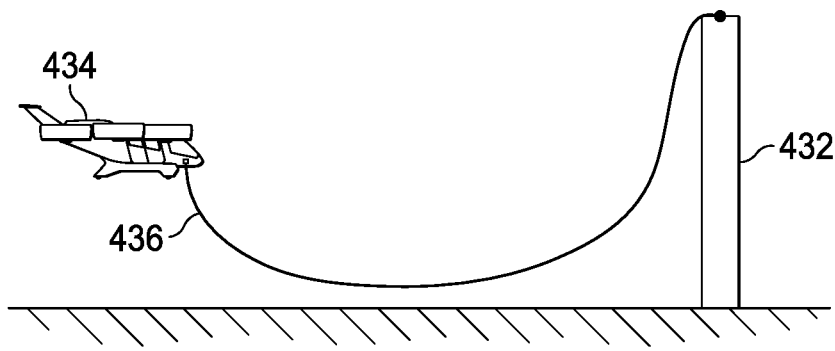
Figure 11C:
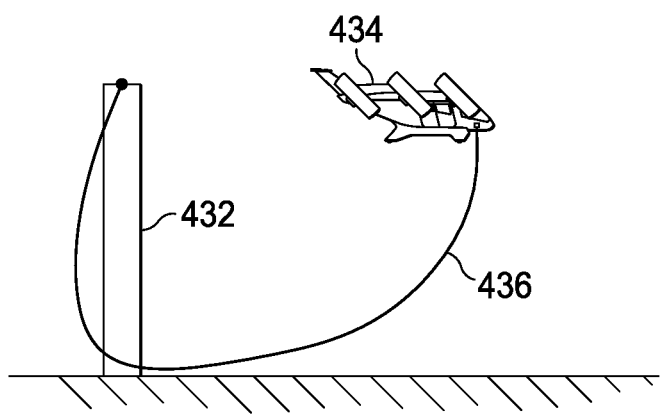
Figure 11D:
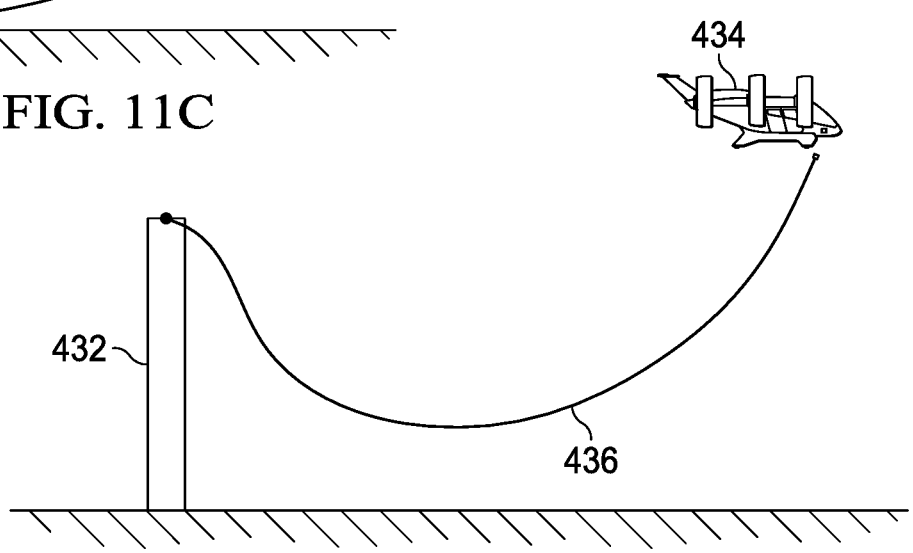

Referring to FIGS. 11A-11D in the drawings, a sequential flight operating scenario is depicted in which an electric power tethering system includes a tower power source 432. In some implementations, aircraft 434 may vertically takeoff while power tether 436 is substantially extended as shown in FIGS. 11A-11B to increase the overall range within which tower power source 432 can provide power to aircraft 434 from takeoff until detachment. After takeoff, aircraft 426 converts into and flies in forward flight mode as shown in FIGS. 11C-11D. Tower power source 432 may include a generator, battery or other power source, or may be an extension of a power grid. The use of tower power source 432 lowers the proportion of tether weight carried by aircraft 434, the weight being borne instead by tower power source 432.

Figure 12:
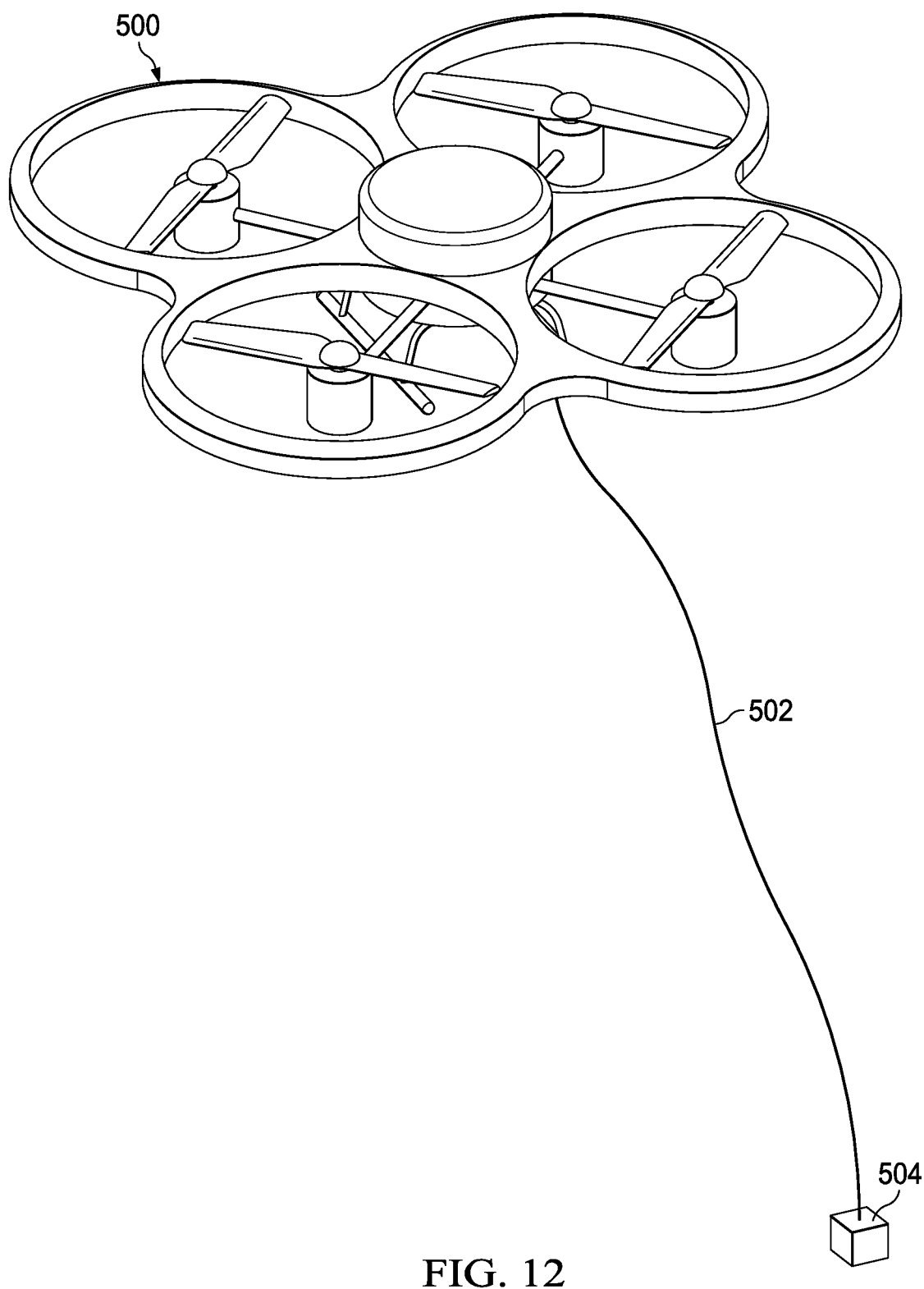
FIG. 12 is a schematic illustration of a quadcopter using an electric power tethering system in accordance with embodiments of the present disclosure.

Referring to FIG. 12 in the drawings, a quadcopter 500 for use with an electric power tethering system is schematically illustrated. Power tether 502 transmits power from surface power source 504 to quadcopter 500. Quadcopter 500 is a VTOL aircraft that does not convert into a forward flight mode. Nonetheless, power tether 502 may detach from quadcopter 500 at any time to increase the range of quadcopter 500. For example, power tether 502 may detach from quadcopter 500 when quadcopter 500 exceeds a power tether extension distance threshold or a ground distance threshold. The ability of quadcopter 500 to use the electric power tethering system illustrates the wide variety of aircraft with which the electric power tethering systems of the illustrative embodiments may be implemented.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An electric power tethering system for an aircraft having a plurality of rotor systems, the aircraft convertible between a vertical takeoff and landing flight mode in which the rotor systems provide thrust-borne lift and a forward flight mode in which the rotor systems provide forward thrust, the vertical takeoff and landing flight mode including a takeoff phase and a hover phase, the system comprising:
   a surface power source; and
   a power tether having a surface end configured to couple to the surface power source and an aircraft end configured to couple to the aircraft, the power tether configured to transmit power from the surface power source to the aircraft in the takeoff phase and the hover phase;
   wherein the power tether is detachable to decouple the surface power source from the aircraft in response to the aircraft converting from the vertical takeoff and landing flight mode to the forward flight mode.

2. The electric power tethering system as recited in claim 1 wherein the surface power source further comprises at least one of a power grid, a generator or a battery.

3. The electric power tethering system as recited in claim 1 wherein the surface power source further comprises a retraction spool configured to retract the power tether.

4. The electric power tethering system as recited in claim 1 wherein the surface power source further comprises a mobile surface power source configured to move along a surface while the power tether couples the mobile surface power source to the aircraft.

5. The electric power tethering system as recited in claim 4 further comprising a land vehicle to transport the mobile surface power source along a land surface.

6. The electric power tethering system as recited in claim 4 further comprising a water vehicle to transport the mobile surface power source along a water surface.

7. The electric power tethering system as recited in claim 1 wherein the surface end of the power tether is detachable from the surface power source in response to the aircraft converting from the vertical takeoff and landing flight mode to the forward flight mode.

8. An aircraft system comprising:
   an eVTOL aircraft having a plurality of rotor systems, the aircraft convertible between a vertical takeoff and landing flight mode in which the rotor systems provide thrust-borne lift and a forward flight mode in which the rotor systems provide forward thrust, the vertical takeoff and landing flight mode including a takeoff phase and a hover phase;
   a surface power source; and
   a power tether having a surface end configured to couple to the surface power source and an aircraft end configured to couple to the aircraft, the power tether configured to transmit power from the surface power source to the aircraft in the takeoff phase and the hover phase;
   wherein the power tether is detachable to decouple the surface power source from the aircraft in response to the aircraft converting from the vertical takeoff and landing flight mode to the forward flight mode.

9. The aircraft system as recited in claim 8 wherein the aircraft further comprises a power inlet configured to couple to the aircraft end of the power tether, the aircraft end of the power tether detachable from the power inlet of the aircraft in response to the aircraft converting from the vertical takeoff and landing flight mode to the forward flight mode.

10. The aircraft system as recited in claim 8 wherein the power tether is detachable to decouple the surface power source from the aircraft in response to a manual user command.

11. The aircraft system as recited in claim 8 wherein the power tether is detachable to decouple the surface power source from the aircraft in response to the power tether extending beyond a power tether extension distance threshold.

12. The aircraft system as recited in claim 8 wherein the power tether is detachable to decouple the surface power source from the aircraft in response to a power consumption of the aircraft falling below a tether power consumption threshold.

13. The aircraft system as recited in claim 8 wherein the aircraft further comprises an onboard battery configured to provide electric power.

14. The aircraft system as recited in claim 13 further comprising a power management module configured to allocate power input for the aircraft from the onboard battery and the surface power source in the takeoff phase and the hover phase.

15. The aircraft system as recited in claim 8 wherein the aircraft further comprises a retraction spool configured to retract the power tether.

16. A method for providing electric power in an aircraft system comprising:
   attaching a surface power source to an electrically powered aircraft using a power tether, the aircraft having a plurality of rotor systems, the aircraft convertible between a vertical takeoff and landing flight mode in which the rotor systems provide thrust-borne lift and a forward flight mode in which the rotor systems provide forward thrust, the vertical takeoff and landing flight mode including a takeoff phase;
   providing electric power to the aircraft from the surface power source via the power tether during the takeoff phase;
   converting the aircraft from the vertical takeoff and landing flight mode to the forward flight mode; and
   detaching the surface power source from the aircraft in response to the aircraft converting from the vertical takeoff and landing flight mode to the forward flight mode.

17. The method as recited in claim 16 wherein the vertical takeoff and landing flight mode includes a hover phase, further comprising:

providing power to the aircraft from the surface power source via the power tether during the hover phase.

18. The method as recited in claim 17 further comprising performing aircraft system checks of the aircraft during the hover phase while electric power is provided to the aircraft via the power tether.

19. The method as recited in claim 16 further comprising charging a battery onboard the aircraft from the surface power source via the power tether while the aircraft is on the ground.

20. The aircraft system as recited in claim 8 wherein the aircraft comprises a tiltrotor aircraft, the rotor systems each rotating in a generally horizontal plane in the vertical takeoff and landing flight mode and a generally vertical plane in the forward flight mode.

* * * * *